US011470405B2

(12) United States Patent
Shivadas et al.

(10) Patent No.: US 11,470,405 B2
(45) Date of Patent: *Oct. 11, 2022

(54) NETWORK VIDEO STREAMING WITH TRICK PLAY BASED ON SEPARATE TRICK PLAY FILES

(71) Applicant: DIVX, LLC, San Diego, CA (US)

(72) Inventors: Abhishek Shivadas, San Diego, CA (US); Stephen R. Bramwell, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/665,652

(22) Filed: Oct. 28, 2019

(65) Prior Publication Data
US 2020/0059706 A1 Feb. 20, 2020

Related U.S. Application Data

(63) Continuation of application No. 15/651,817, filed on Jul. 17, 2017, now Pat. No. 10,462,537, which is a
(Continued)

(51) Int. Cl.
H04N 21/845 (2011.01)
H04N 21/472 (2011.01)
(Continued)

(52) U.S. Cl.
CPC ......... *H04N 21/8455* (2013.01); *H04L 65/70* (2022.05); *H04N 19/98* (2014.11);
(Continued)

(58) Field of Classification Search
CPC ......... H04N 21/8455; H04N 21/47217; H04N 21/6587; H04N 21/234345;
(Continued)

(56) References Cited

U.S. PATENT DOCUMENTS 5,400,401 A 3/1995 Wasilewski et al.
5,574,785 A 11/1996 Ueno et al.
(Continued)

FOREIGN PATENT DOCUMENTS

CA 2237293 A1 7/1997
CA 2823829 C 1/2019
(Continued)

OTHER PUBLICATIONS

Declaration of Patrick McDaniel, Ph.D., Inter Partes Review of U.S. Pat. No. 10,225,588, IPR filed Feb. 15, 2020, 211 pgs.
(Continued)

*Primary Examiner* — Oschta I Montoya
(74) *Attorney, Agent, or Firm* — KPPB LLP

(57) ABSTRACT

Network services encode multimedia content, such as video, into multiple adaptive bitrate streams of encoded video and a separate trick play stream of encoded video to support trick play features. The trick play stream is encoded at a lower encoding bitrate and frame rate than each of the adaptive bitrate streams. The adaptive bitrate streams and the trick play stream are stored in the network services. During normal content streaming and playback, a client device downloads a selected one of the adaptive bitrate streams from network serviced for playback at the client device. To implement a trick play feature, the client device downloads the trick play stream from the network services for trick play playback.

14 Claims, 11 Drawing Sheets

Related U.S. Application Data continuation of application No. 14/810,345, filed on Jul. 27, 2015, now Pat. No. 9,712,890, which is a continuation of application No. 13/905,852, filed on May 30, 2013, now Pat. No. 9,094,737.

(51) Int. Cl.

| | | |
|---|---|---|
| *H04N 21/6587* | (2011.01) | |
| *H04N 19/98* | (2014.01) | |
| *H04N 21/2343* | (2011.01) | |
| *H04N 21/2387* | (2011.01) | |
| *H04N 21/262* | (2011.01) | |
| *H04N 21/854* | (2011.01) | |
| *H04L 65/70* | (2022.01) | |

(52) U.S. Cl.
 CPC ... *H04N 21/2387* (2013.01); *H04N 21/23439* (2013.01); *H04N 21/234345* (2013.01); *H04N 21/234381* (2013.01); *H04N 21/26258* (2013.01); *H04N 21/47217* (2013.01); *H04N 21/6587* (2013.01); *H04N 21/8456* (2013.01); *H04N 21/85406* (2013.01)

(58) Field of Classification Search
 CPC ..... H04N 21/234381; H04N 21/23439; H04N 21/2387; H04N 21/26258; H04N 21/8456; H04N 21/85406; H04N 19/98; H04L 65/607
 See application file for complete search history.

(56) References Cited

U.S. PATENT DOCUMENTS

| | | |
|---|---|---|
| 5,600,721 A | 2/1997 | Kitazato |
| 5,642,338 A | 6/1997 | Fukushima et al. |
| 5,813,010 A | 9/1998 | Kurano et al. |
| 5,819,160 A | 10/1998 | Foladare et al. |
| 5,854,873 A | 12/1998 | Mori et al. |
| 5,907,658 A | 5/1999 | Murase et al. |
| 5,923,869 A | 7/1999 | Kashiwagi et al. |
| 6,002,834 A | 12/1999 | Hirabayashi et al. |
| 6,009,237 A | 12/1999 | Hirabayashi et al. |
| 6,016,381 A | 1/2000 | Taira et al. |
| 6,057,832 A | 5/2000 | Lev et al. |
| 6,266,483 B1 | 7/2001 | Okada et al. |
| 6,282,320 B1 | 8/2001 | Hasegawa et al. |
| 6,320,905 B1 | 11/2001 | Konstantinides |
| 6,351,538 B1 | 2/2002 | Uz |
| 6,373,803 B2 | 4/2002 | Ando et al. |
| 6,415,031 B1 | 7/2002 | Colligan et al. |
| 6,441,754 B1 | 8/2002 | Wang et al. |
| 6,445,877 B1 | 9/2002 | Okada et al. |
| 6,453,115 B1 | 9/2002 | Boyle |
| 6,453,116 B1 | 9/2002 | Ando et al. |
| 6,504,873 B1 | 1/2003 | Vehvilaeinen |
| 6,512,883 B2 | 1/2003 | Shim et al. |
| 6,532,262 B1 | 3/2003 | Fukuda et al. |
| 6,594,699 B1 | 7/2003 | Sahai et al. |
| 6,654,933 B1 | 11/2003 | Abbott et al. |
| 6,690,838 B2 | 2/2004 | Zhou |
| 6,724,944 B1 | 4/2004 | Kalevo et al. |
| 6,751,623 B1 | 6/2004 | Basso et al. |
| 6,813,437 B2 | 11/2004 | Ando et al. |
| 6,868,525 B1 | 3/2005 | Szabo |
| 6,871,006 B1 | 3/2005 | Oguz et al. |
| 6,912,513 B1 | 6/2005 | Candelore |
| 6,931,531 B1 | 8/2005 | Takahashi |
| 6,957,350 B1 | 10/2005 | Demos |
| 6,970,564 B1 | 11/2005 | Kubota et al. |
| 6,983,079 B2 | 1/2006 | Kim |
| 7,006,757 B2 | 2/2006 | Ando et al. |
| 7,020,287 B2 | 3/2006 | Unger |
| 7,181,438 B1 | 2/2007 | Szabo |
| 7,188,183 B1 | 3/2007 | Paul et al. |
| 7,191,335 B1 | 3/2007 | Maillard |
| 7,212,726 B2 | 5/2007 | Zetts |
| 7,274,861 B2 | 9/2007 | Yahata et al. |
| 7,352,956 B1 | 4/2008 | Winter et al. |
| 7,382,879 B1 | 6/2008 | Miller |
| 7,397,853 B2 | 7/2008 | Kwon et al. |
| 7,400,679 B2 | 7/2008 | Kwon et al. |
| 7,418,132 B2 | 8/2008 | Hoshuyama |
| 7,457,415 B2 | 11/2008 | Reitmeier et al. |
| 7,499,930 B2 | 3/2009 | Naka et al. |
| 7,546,641 B2 | 6/2009 | Robert et al. |
| 7,639,921 B2 | 12/2009 | Seo et al. |
| 7,711,052 B2 | 5/2010 | Hannuksela et al. |
| 7,711,647 B2 | 5/2010 | Gunaseelan et al. |
| 7,853,980 B2 | 12/2010 | Pedlow, Jr. et al. |
| 7,864,186 B2 | 1/2011 | Robotham et al. |
| 7,873,740 B2 | 1/2011 | Sitaraman et al. |
| 7,945,143 B2 | 5/2011 | Yahata et al. |
| 7,984,513 B1 | 7/2011 | Kyne et al. |
| 8,131,875 B1 | 3/2012 | Chen |
| 8,169,916 B1 | 5/2012 | Pai et al. |
| 8,243,924 B2 | 8/2012 | Chen et al. |
| 8,286,213 B2 | 10/2012 | Seo |
| 8,286,621 B2 | 10/2012 | Halmone |
| 8,312,079 B2 | 11/2012 | Newsome et al. |
| 8,325,800 B2 | 12/2012 | Holcomb et al. |
| 8,327,009 B2 | 12/2012 | Prestenback et al. |
| 8,369,421 B2 | 2/2013 | Kadono et al. |
| 8,472,792 B2 | 6/2013 | Butt |
| 8,484,368 B2 | 7/2013 | Robert et al. |
| 8,681,866 B1 | 3/2014 | Jia |
| 8,683,066 B2 | 3/2014 | Hurst et al. |
| 8,782,268 B2 | 7/2014 | Pyle et al. |
| 8,819,116 B1 | 8/2014 | Tomay et al. |
| 8,849,950 B2 | 9/2014 | Stockhammer et al. |
| 8,918,636 B2 | 12/2014 | Kiefer |
| 8,964,977 B2 | 2/2015 | Ziskind et al. |
| 9,025,659 B2 | 5/2015 | Soroushian et al. |
| 9,038,116 B1 | 5/2015 | Knox et al. |
| 9,049,497 B2 | 6/2015 | Chen et al. |
| 9,667,684 B2 | 5/2017 | Ziskind et al. |
| 10,212,486 B2 | 2/2019 | Chan et al. |
| 10,225,299 B2 | 3/2019 | van Der Schaar et al. |
| 10,225,588 B2 | 3/2019 | Kiefer et al. |
| 10,264,255 B2 | 4/2019 | Naletov et al. |
| 10,321,168 B2 | 6/2019 | van Der Schaar et al. |
| 10,341,698 B2 | 7/2019 | Kiefer et al. |
| 10,368,096 B2 | 7/2019 | Braness et al. |
| 10,382,785 B2 | 8/2019 | Braness et al. |
| 10,437,896 B2 | 10/2019 | Soroushian et al. |
| 10,462,537 B2 | 10/2019 | Shivadas et al. |
| 10,856,020 B2 | 12/2020 | Kiefer et al. |
| 2001/0021276 A1 | 9/2001 | Zhou |
| 2001/0052077 A1 | 12/2001 | Fung et al. |
| 2001/0052127 A1 | 12/2001 | Seo et al. |
| 2002/0048450 A1 | 4/2002 | Zetts |
| 2002/0067432 A1 | 6/2002 | Kondo et al. |
| 2002/0135607 A1 | 9/2002 | Kato et al. |
| 2002/0141503 A1 | 10/2002 | Kobayashi et al. |
| 2002/0154779 A1 | 10/2002 | Asano et al. |
| 2002/0159528 A1 | 10/2002 | Graziani et al. |
| 2002/0164024 A1 | 11/2002 | Arakawa et al. |
| 2002/0169971 A1 | 11/2002 | Asano et al. |
| 2003/0002577 A1 | 1/2003 | Pinder |
| 2003/0044080 A1 | 3/2003 | Frishman et al. |
| 2003/0053541 A1 | 3/2003 | Sun et al. |
| 2003/0063675 A1 | 4/2003 | Kang et al. |
| 2003/0077071 A1 | 4/2003 | Lin et al. |
| 2003/0078891 A1 | 4/2003 | Capitant |
| 2003/0135742 A1 | 7/2003 | Evans |
| 2003/0142594 A1 | 7/2003 | Tsumagari et al. |
| 2003/0206717 A1 | 11/2003 | Yogeshwar et al. |
| 2003/0210821 A1 | 11/2003 | Yogeshwar et al. |
| 2004/0001594 A1 | 1/2004 | Krishnaswamy et al. |
| 2004/0022391 A1 | 2/2004 | Obrien |
| 2004/0028227 A1 | 2/2004 | Yu |
| 2004/0037421 A1 | 2/2004 | Truman |
| 2004/0047592 A1 | 3/2004 | Seo et al. |

(56) References Cited

U.S. PATENT DOCUMENTS

| | | |
|---|---|---|
| 2004/0047607 A1 | 3/2004 | Seo et al. |
| 2004/0076237 A1 | 4/2004 | Kadono et al. |
| 2004/0084035 A1 | 5/2004 | Newton |
| 2004/0093494 A1 | 5/2004 | Nishimoto et al. |
| 2004/0101059 A1 | 5/2004 | Joch et al. |
| 2004/0101142 A1 | 5/2004 | Nasypny |
| 2004/0107356 A1 | 6/2004 | Shamoon et al. |
| 2004/0243488 A1 | 12/2004 | Yamamoto et al. |
| 2005/0013494 A1 | 1/2005 | Srinivasan et al. |
| 2005/0015509 A1 | 1/2005 | Sitaraman et al. |
| 2005/0063541 A1 | 3/2005 | Candelore |
| 2005/0076232 A1 | 4/2005 | Kawaguchi |
| 2005/0132208 A1 | 6/2005 | Hug et al. |
| 2005/0144468 A1 | 6/2005 | Northcutt |
| 2005/0177741 A1 | 8/2005 | Chen et al. |
| 2005/0243912 A1 | 11/2005 | Kwon et al. |
| 2005/0265555 A1 | 12/2005 | Pippuri |
| 2006/0013568 A1 | 1/2006 | Rodriguez |
| 2006/0020825 A1 | 1/2006 | Grab |
| 2006/0059223 A1 | 3/2006 | Klemets et al. |
| 2006/0165163 A1 | 7/2006 | Burazerovic et al. |
| 2006/0165233 A1 | 7/2006 | Nonaka et al. |
| 2007/0047645 A1 | 3/2007 | Takashima |
| 2007/0067472 A1 | 3/2007 | Maertens et al. |
| 2007/0067622 A1 | 3/2007 | Nakano et al. |
| 2007/0083467 A1 | 4/2007 | Lindahl et al. |
| 2007/0180051 A1 | 8/2007 | Kelly et al. |
| 2007/0201695 A1 | 8/2007 | Saarikivi |
| 2007/0256141 A1 | 11/2007 | Nakano et al. |
| 2008/0008319 A1 | 1/2008 | Poirier |
| 2008/0086570 A1 | 4/2008 | Dey et al. |
| 2008/0101718 A1 | 5/2008 | Yang et al. |
| 2008/0131078 A1 | 6/2008 | Jeong et al. |
| 2008/0137847 A1 | 6/2008 | Candelore et al. |
| 2008/0162949 A1 | 7/2008 | Sato et al. |
| 2008/0219449 A1 | 9/2008 | Ball et al. |
| 2008/0229025 A1 | 9/2008 | Plamondon |
| 2008/0271102 A1 | 10/2008 | Kienzle et al. |
| 2008/0320160 A1 | 12/2008 | Sitaraman et al. |
| 2009/0010622 A1 | 1/2009 | Yahata et al. |
| 2009/0013195 A1 | 1/2009 | Ochi et al. |
| 2009/0077143 A1 | 3/2009 | Macy, Jr. |
| 2009/0106082 A1 | 4/2009 | Senti et al. |
| 2009/0249081 A1 | 10/2009 | Zayas |
| 2009/0268905 A1 | 10/2009 | Matsushima et al. |
| 2009/0282162 A1 | 11/2009 | Mehrotra et al. |
| 2009/0307258 A1 | 12/2009 | Priyadarshi et al. |
| 2009/0310819 A1 | 12/2009 | Hatano |
| 2010/0142915 A1 | 6/2010 | Mcdermott et al. |
| 2010/0189183 A1 | 7/2010 | Gu et al. |
| 2010/0235528 A1 | 9/2010 | Bocharov et al. |
| 2011/0010466 A1 | 1/2011 | Fan et al. |
| 2011/0058675 A1 | 3/2011 | Brueck et al. |
| 2011/0082914 A1 | 4/2011 | Robert et al. |
| 2011/0103374 A1 | 5/2011 | Lajoie et al. |
| 2011/0145858 A1 | 6/2011 | Philpott et al. |
| 2011/0173345 A1 | 7/2011 | Knox et al. |
| 2011/0179185 A1 | 7/2011 | Wang et al. |
| 2011/0197261 A1 | 8/2011 | Dong et al. |
| 2011/0246661 A1 | 10/2011 | Manzari et al. |
| 2011/0296048 A1 | 12/2011 | Knox et al. |
| 2011/0314130 A1 | 12/2011 | Strasman |
| 2012/0005312 A1 | 1/2012 | Mcgowan et al. |
| 2012/0042090 A1 | 2/2012 | Chen et al. |
| 2012/0047542 A1 | 2/2012 | Lewis et al. |
| 2012/0110120 A1 | 5/2012 | Willig et al. |
| 2012/0147958 A1 | 6/2012 | Ronca et al. |
| 2012/0167132 A1 | 6/2012 | Mathews et al. |
| 2012/0257678 A1 | 10/2012 | Zhou et al. |
| 2012/0260277 A1 | 10/2012 | Kosciewicz |
| 2012/0311094 A1* | 12/2012 | Biderman .......... H04N 21/8456 709/219 |
| 2012/0311174 A1 | 12/2012 | Bichot et al. |
| 2012/0331167 A1 | 12/2012 | Hunt |
| 2013/0013803 A1 | 1/2013 | Bichot et al. |
| 2013/0080267 A1 | 3/2013 | McGowan |
| 2013/0159633 A1 | 6/2013 | Lilly |
| 2013/0179589 A1 | 7/2013 | McCarthy et al. |
| 2014/0019592 A1 | 1/2014 | Arana et al. |
| 2014/0096269 A1 | 4/2014 | Amidei et al. |
| 2014/0140253 A1 | 5/2014 | Lohmar et al. |
| 2014/0149557 A1 | 5/2014 | Lohmar et al. |
| 2015/0281310 A1 | 10/2015 | Ziskind et al. |
| 2015/0288530 A1 | 10/2015 | Oyman |
| 2017/0214947 A1 | 7/2017 | Kiefer et al. |
| 2017/0238030 A1 | 8/2017 | Ziskind et al. |
| 2018/0007451 A1 | 1/2018 | Shivadas et al. |
| 2018/0060543 A1 | 3/2018 | Grab et al. |
| 2018/0262757 A1 | 9/2018 | Naletov et al. |
| 2018/0285261 A1 | 10/2018 | Mandal et al. |
| 2018/0332094 A1 | 11/2018 | Braness |
| 2019/0020907 A1 | 1/2019 | Kiefer et al. |
| 2019/0020928 A1 | 1/2019 | Chan et al. |
| 2019/0045219 A1 | 2/2019 | Braness et al. |
| 2019/0045220 A1 | 2/2019 | Braness et al. |
| 2019/0045234 A1 | 2/2019 | Kiefer et al. |
| 2019/0158553 A1 | 5/2019 | Van Der Schaar et al. |
| 2019/0297364 A1 | 9/2019 | van Der Schaar et al. |
| 2019/0342587 A1 | 11/2019 | Kiefer et al. |
| 2019/0356928 A1 | 11/2019 | Braness et al. |

FOREIGN PATENT DOCUMENTS

| | | |
|---|---|---|
| CN | 105072454 B | 4/2019 |
| EP | 0818111 A1 | 1/1998 |
| EP | 0818111 B1 | 1/2000 |
| EP | 1453319 A1 | 9/2004 |
| EP | 1283640 B1 | 10/2006 |
| EP | 2180664 A1 | 4/2010 |
| EP | 2360923 A1 | 8/2011 |
| EP | 2661875 B1 | 11/2019 |
| EP | 2661696 B1 | 5/2020 |
| EP | 3697096 A1 | 8/2020 |
| EP | 3700219 A1 | 8/2020 |
| EP | 3742740 A1 | 11/2020 |
| EP | 3975574 A1 | 3/2022 |
| JP | 2004328218 A | 11/2004 |
| JP | 2005504480 A | 2/2005 |
| JP | 2005286881 A | 10/2005 |
| JP | 2006521035 A | 9/2006 |
| JP | 2009522887 A | 6/2009 |
| JP | 6453291 B2 | 1/2019 |
| JP | 6657313 B2 | 2/2020 |
| JP | 202080551 A | 5/2020 |
| KR | 20040039852 A | 5/2004 |
| KR | 20060106250 A | 10/2006 |
| KR | 20070005699 A | 1/2007 |
| KR | 20100106418 A | 10/2010 |
| KR | 101917763 B1 | 11/2018 |
| KR | 101988877 B1 | 6/2019 |
| KR | 102072839 B1 | 1/2020 |
| KR | 102122189 B1 | 6/2020 |
| RU | 2328040 C2 | 6/2008 |
| WO | 2000049762 A2 | 8/2000 |
| WO | 2000049763 A1 | 8/2000 |
| WO | 2003047262 A2 | 6/2003 |
| WO | 2004012378 A2 | 2/2004 |
| WO | 2004100158 A1 | 11/2004 |
| WO | 2005008385 A2 | 1/2005 |
| WO | 2005015935 A1 | 2/2005 |
| WO | 2005109224 A2 | 11/2005 |
| WO | 2009006302 A1 | 1/2009 |
| WO | 2009070770 A1 | 6/2009 |
| WO | 2009109976 A2 | 9/2009 |
| WO | 2010005673 A2 | 1/2010 |
| WO | 2011086190 A1 | 7/2011 |

(56) References Cited

FOREIGN PATENT DOCUMENTS

| | | |
|---|---|---|
| WO | 2011087449 A1 | 7/2011 |
| WO | 2011101371 A1 | 8/2011 |

OTHER PUBLICATIONS

First Amended Complaint for Patent Infringement, *DivX, LLC* v. *Netflix, Inc.*, No. 2:19-cv-1602-PSG, Am. Compl. (C.D. Cal Aug. 21, 2019), 229 pgs., IPR filed Feb. 15, 2020.
Petition for Inter Partes Review of U.S. Pat. No. 10,225,588, IPR2020-00558, 96 pgs., IPR filed Feb. 15, 2020.
Power of Attorney—Hulu, LLC (IPR2020-00558), 4 pgs., IPR filed Feb. 15, 2020.
Power of Attorney—Netflix, Inc. (IPR2020-00558), 4 pgs., IPR filed Feb. 15, 2020.
U.S. Appl. No. 61/530,305, filed Sep. 1, 2011, 6 pgs.
Written Opinion for International Application No. PCT/US2007/063950 filed Mar. 14, 2007, report completed Mar. 1, 2008; report dated Mar. 19, 2008, 6 pgs.
"DVD-MPeg differences", printed Jul. 2, 2009 from http://dvd.sourceforge.net/dvdinfo/dvdmpeg.html, 1 pg.
"HTTP Live Streaming on the Leading Media CDN", Akamai website, retrieved from http://www.akamai.com/html/resources/http-live-streaming.html, 2015, accessed May 11, 2015, 5 pgs.
"Media Delivery Solutions for Streaming Video and Software Delivery", Akamai website, Retrieved from http://www.akamai.com/html/solutions/media-delivery-solutions.html, 2015, Accessed May 11, 2015, 5 pgs.
"Microsoft Announces Breakthrough Technology Enabling Simple Access to Broad Set of Digital Content, Including Music, Games, Video, Ring Tones and Pictures", Microsoft, Feb. 12, 2017, Retrieved from https://news.microsoft.com/2007/02/12/microsoft-announces-breakthrough-technology-enabling-simple-access-to-broad-set-of-digital-content-including-music-games-video-ring-tones-and-pictures/, 5 pgs.
"SDMI Secure Digital Music Initiative", SDMI Portable Device Specification, Part 1, Version 1.0, Jul. 8, 1999, pp. 1-35.
"Supplementary European Search Report for Application No. EP 10834935, International Filing Date Nov. 15, 2010, Search Completed May 27, 2014, 9 pgs."
De Cock et al., "Complexity-Based Consistent-Quality Encoding in the Cloud", IEEE International Conference on Image Processing (ICIP), Date of Conference Sep. 25-28, 2016, Phoenix, AZ, pp. 1484-1488.
Lin et al., "Multipass Encoding for Reducing Pulsing Artifacts in Cloud Based Video Transcoding", IEEE International Conference on Image Processing (ICIP), Date of Conference Sep. 27, 30, 2015, Quebec City, QC, Canada, pp. 907-911.
Sheu, Tsang-Ling et al., "Dynamic layer adjustments for SVC segments in P2P streaming networks", Computer Symposium (ICS), 2010, 2010 International, Tainan, Taiwan, R.O.C., pp. 793-798.
Unknown, "MPEG-4 Video Encoder: Based on International Standard ISO/IEC 14496-2", Patni Computer Systems, Ltd., publication date unknown, 15 pgs.
Prosecution File History for U.S. Appl. No. 13/340,623 to Kiefer et al. ("Kiefer"), IPR filed Feb. 15, 2020, 1249 pgs., presented in 6 parts.
Prosecution File History for U.S. Pat. No. 10,225,588, IPR filed Feb. 15, 2020, 2937 pgs., presented in 29 parts.
Decision Granting Institution of Inter Partes Review 35 U.S.C. § 314, IPR2020-00558, U.S. Pat. No. 10,225,588, 46 pgs.
Extended European Search Report for European Application No. 19211286.0, Search completed Jul. 3, 2020, dated Jul. 13, 2020, 9 Pgs.
Extended European Search Report for European Application No. 19211291.0, Search completed Jul. 6, 2020, dated Jul. 14, 2020, 12 Pgs.
Extended European Search Report for European Application No. 20172313.7 Search completed Aug. 19, 2020 dated Aug. 27, 2020, 11 Pgs.
Information Technology—MPEG Systems Technologies—Part 7: Common Encryption in ISO Base Media File Format Files (ISO/IEC 23001-7), Apr. 2015, 24 pgs.
ISO/IEC 14496-12 Information technology—Coding of audio-visual objects—Part 12: ISO base media file format, Feb. 2004 ("MPEG-4 Part 12 Standard"), 62 pgs.
ISO/IEC 14496-12:2008(E) Informational Technology—Coding of Audio-Visual Objects Part 12: ISO Base Media File Format, Oct. 2008, 120 pgs.
ISO/IEC FCD 23001-6 MPEG systems technologies Part 6: Dynamic adaptive streaming over HTTP (DASH), Jan. 28, 2011, 86 pgs.
Microsoft Corporation, Advanced Systems Format (ASF) Specification, Revision 01.20.03, Dec. 2004, 121 pgs.
MPEG-DASH presentation at Streaming Media West 2011, Nov. 2011, 14 pgs.
Pomelo, LLC Tech Memo, Analysis of Netflix's Security Framework for 'Watch Instantly' Service, Mar.-Apr. 2009, 18 pgs.
Server-Side Stream Repackaging (Streaming Video Technologies Panorama, Part 2), Jul. 2011, 15 pgs.
Text of ISO/IEC 23001-6: Dynamic adaptive streaming over HTTP (DASH), Oct. 2010, 71 pgs.
Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
"Apple HTTP Live Streaming specification", Aug. 2017, 60 pgs.
"Data Encryption Decryption using AES Algorithm, Key and Salt with Java Cryptography Extension", Available at https://www.digizol.com/2009/10/java-encrypt-decrypt-jce-salt.html, October 200, 6 pgs.
"Delivering Live and On-Demand Smooth Streaming", Microsoft Silverlight, 2009, 28 pgs.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
"Java Cryptography Architecture API Specification & Reference", Available at https://docs.oracle.com/javase/1.5.0/docs/guide/security/CryptoSpec.html, Jul. 25, 2004, 68 pgs.
"Java Cryptography Extension, javax.crypto.Cipher class", Available at https://docs.oracle.com/javase/1.5.0/docs/api/javax/crypto/Cipher.html, 2004, 24 pgs.
"JCE Encryption—Data Encryption Standard (DES) Tutorial", Available at https://mkyong.com/java/jce-encryption-data-encryption-standard-des-tutorial/, Feb. 25, 2009, 2 pgs.
"Live and On-Demand Video with Silverlight and IIS Smooth Streaming", Microsoft Silverlight, Windows Server Internet Information Services 7.0, Feb. 2010, 15 pgs.
"Microsoft Smooth Streaming specification", Jul. 22, 2013, 56 pgs.
"Single-Encode Streaming for Multiple Screen Delivery", Telestream Wowza Media Systems, 2009, 6 pgs.
"The MPEG-DASH Standard for Multimedia Streaming Over the Internet", IEEE MultiMedia, vol. 18, No. 4, 2011, 7 pgs.
"Windows Media Player 9", Microsoft, Mar. 23, 2017, 3 pgs.
Abomhara et al., "Enhancing Selective Encryption for H.264/AVC Using Advanced Encryption Standard", International Journal of computer Theory and Engineering, Apr. 2010, vol. 2, No. 2, pp. 223-229.
Alattar et al., A.M., "Improved selective encryption techniques for secure transmission of MPEG video bit-streams", In Proceedings 1999 International Conference on Image Processing (Cat. 99CH36348), vol. 4, IEEE, 1999, pp. 256-260.
Antoniou et al., "Adaptive Methods for the Transmission of Video Streams in Wireless Networks", 2015, 50 pgs.
Apostolopoulos et al.,"Secure Media Streaming and Secure Transcoding", Multimedia Security Technologies for Digital Rights Management, 2006, 33 pgs.
Asai et al., "Essential Factors for Full-Interactive VOD Server: Video File System, Disk Scheduling, Network", Proceedings of Globecom '95, Nov. 14-16, 1995, 6 pgs.

(56) References Cited

OTHER PUBLICATIONS

Beker et al., "Cipher Systems, The Protection of Communications", 1982, 40 pgs.
Bocharov et al, Portable Encoding of Audio-Video Objects, The Protected Interoperable File Format (PIFF), Microsoft Corporation, First Edition Sep. 8, 2009, 30 pgs.
Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs. (presented in five parts).
Cahill et al., "Locally Adaptive Deblocking Filter for Low Bit Rate Video", Proceedings 2000 International Conference on Image Processing, Sep. 10-13, 2000, Vancouver, BC, Canada, 4 pgs.
Candelore, U.S. Appl. No. 60/372,901, filed Apr. 17, 2002, 5 pgs.
Chaddha et al., "A Frame-work for Live Multicast of Video Streams over the Internet", Proceedings of 3rd IEEE International Conference on Image Processing, Sep. 19, 1996, Lausanne, Switzerland, 4 pgs.
Cheng, "Partial Encryption for Image and Video Communication", Thesis, Fall 1998, 95 pgs.
Cheng et al., "Partial encryption of compressed images and videos", IEEE Transactions on Signal Processing, vol. 48, No. 8, Aug. 2000, 33 pgs.
Cheung et al., "On the Use of Destination Set Grouping to Improve Fairness in Multicast Video Distribution", Proceedings of IEEE INFOCOM'96, Conference on Computer Communications, vol. 2, IEEE, 1996, 23 pgs.
Collet, "Delivering Protected Content, An Approach for Next Generation Mobile Technologies", Thesis, 2010, 84 pgs.
Diamantis et al., "Real Time Video Distribution using Publication through a Database", Proceedings SIBGRAPI'98. International Symposium on Computer Graphics, Image Processing, and Vision (Cat. No. 98EX237), Oct. 1990, 8 pgs.
Dworkin, "Recommendation for Block Cipher Modes of Operation: Methods and Techniques", NIST Special Publication 800-38A, 2001, 66 pgs.
Fang et al., "Real-time deblocking filter for MPEG-4 systems", Asia-Pacific Conference on Circuits and Systems, Oct. 28-31, 2002, Bail, Indonesia, 4 pgs.
Fielding et al., "Hypertext Transfer Protocol—HTTP1.1", Network Working Group, RFC 2616, Jun. 1999, 114 pgs.
Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, 4 pgs.
Huang, U.S. Pat. No. 7,729,426, U.S. Appl. No. 11/230,794, filed Sep. 20, 2005, 143 pgs.
Huang et al., "Adaptive MLP post-processing for block-based coded images", IEEE Proceedings—Vision, Image and Signal Processing, vol. 147, No. 5, Oct. 2000, pp. 463-473.
Huang et al., "Architecture Design for Deblocking Filter in H.264/JVT/AVC", 2003 International Conference on Multimedia and Expo., Jul. 6-9, 2003, Baltimore, MD, 4 pgs.
Jain et al., U.S. Appl. No. 61/522,623, filed Aug. 11, 2011, 44 pgs.
Jung et al., "Design and Implementation of an Enhanced Personal Video Recorder for DTV", IEEE Transactions on Consumer Electronics, vol. 47, No. 4, Nov. 2001, 6 pgs.
Kalva, Hari, "Delivering MPEG-4 Based Audio-Visual Services", 2001, 113 pgs.
Kang et al., "Access Emulation and Buffering Techniques for Steaming of Non-Stream Format Video Files", IEEE Transactions on Consumer Electronics, vol. 43, No. 3, Aug. 2001, 7 pgs.
Kim et al, "A Deblocking Filter with Two Separate Modes in Block-based Video Coding", IEEE transactions on circuits and systems for video technology, vol. 9, No. 1, 1999, pp. 156-160.
Kim et al., "Tree-Based Group Key Agreement", Feb. 2004, 37 pgs.
Laukens, "Adaptive Streaming—A Brief Tutorial", EBU Technical Review, 2011, 6 pgs.
Legault et al., "Professional Video Under 32-bit Windows Operating Systems", SMPTE Journal, vol. 105, No. 12, Dec. 1996, 10 pgs.
Li et al., "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies. Gateway to the 21st Century, Cat. No. 98, vol. 3, 1998, 26 pgs.
List et al., "Adaptive deblocking filter", IEEE transactions on circuits and systems for video technology, vol. 13, No. 7, Jul. 2003, pp. 614-619.
Massoudi et al., "Overview on Selective Encryption of Image and Video Challenges and Perspectives", EURASIP Journal on Information Security, Nov. 2008, 18 pgs.
McCanne et al., "Receiver-driven Layered Multicast", Conference proceedings on Applications, technologies, architectures, and protocols for computer communications, Aug. 1996, 14 pgs.
Meier, "Reduction of Blocking Artifacts in Image and Video Coding", IEEE Transactions on Circuits and Systems for Video Technology, vol. 9, No. 3, Apr. 1999, pp. 490-500.
Newton et al., "Preserving Privacy by De-identifying Facial Images", Carnegie Mellon University School of Computer Science, Technical Report, CMU-CS-03-119, Mar. 2003, 26 pgs.
O'Brien, U.S. Appl. No. 60/399,846, filed Jul. 30, 2002, 27 pgs.
O'Rourke, "Improved Image Decompression for Reduced Transform Coding Artifacts", IEEE Transactions on Circuits and Systems for Video Technology, vol. 5, No. 6, Dec. 1995, pp. 490-499.
Park et al., "A postprocessing method for reducing quantization effects in low bit-rate moving picture coding", IEEE Transactions on Circuits and Systems for Video Technology, vol. 9, No. 1, Feb. 1999, pp. 161-171.
Richardson, "H.264 and MPEG-4 Video Compression", Wiley, 2003, 306 pgs. (presented in 2 parts).
Sima et al., "An Efficient Architecture for Adaptive Deblocking Filter of H.264 AVC Video Coding", IEEE Transactions on Consumer Electronics, vol. 50, No. 1, Feb. 2004, pp. 292-296.
Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.
Srinivasan et al., "Windows Media Video 9: overview and applications", Signal Processing: Image Communication, 2004, 25 pgs.
Stockhammer, "Dynamic Adaptive Streaming over HTTP-Standards and Design Principles", Proceedings of the second annual ACM conference on Multimedia, Feb. 2011, pp. 133-145.
Timmerer et al., "HTTP Streaming of MPEG Media", Proceedings of Streaming Day, 2010, 4 pgs.
Tiphaigne et al., "A Video Package for Torch", Jun. 2004, 46 pgs.
Trappe et al., "Key Management and Distribution for Secure Multimedia Multicast", IEEE Transaction on Multimedia, vol. 5, No. 4, Dec. 2003, pp. 544-557.
Van Deursen et al., "On Media Delivery Protocols in the Web", 2010 IEEE International Conference on Multimedia and Expo, Jul. 19-23, 2010, 6 pgs.
Ventura, Guillermo Albaida, "Streaming of Multimedia Learning Objects", AG Integrated Communication System, Mar. 2003, 101 pgs.
Waggoner, "Compression for Great Digital Video", 2002, 184 pgs.
Watanabem et al., "MPEG-2 decoder enables DTV trick plays", esearcher System LSI Development Lab, Fujitsu Laboratories Ltd., Kawasaki, Japan, Jun. 2001, 2 pgs.
Wiegand, "Joint Video Team (JVT) of ISO/IEC MPEG and ITU-T VCEG", Jan. 2002, 70 pgs.
Willig et al., U.S. Appl. No. 61/409,285, filed Nov. 2, 2010, 43 pgs.
Yang et al., "Projection-Based Spatially Adaptive Reconstruction of Block-Transform Compressed Images", IEEE Transactions on Image Processing, vol. 4, No. 7, Jul. 1995, pp. 896-908.
Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.
Yu et al., "Video deblocking with fine-grained scalable complexity for embedded mobile computing", Proceedings 7th International Conference on Signal Processing, Aug. 31-Sep. 4, 2004, pp. 1173-1178.

(56) References Cited

OTHER PUBLICATIONS

Zakhor, "Iterative Procedures for Reduction of Blocking Effects in Transform Image Coding", IEEE Transactions on Circuits and Systems for Video Technology, vol. 2, No. 1, Mar. 1992, pp. 91-95.

Hunt, "Encoding for streaming", The Netflix Blog, Nov. 6, 2008, printed from https://web.archive.org/web/20081216044437/http:/blog.netflix.com/2008/11/encoding-for-streaming.htm., retrieved on Feb. 8, 2022, 28 pgs.

Pereira, "Security on Over the Top TV Services", Thesis, Nov. 2011, 114 pgs.

Stockhammer, "MPEG's Dynamic Adaptive Streaming over HTTP (DASH)—An Enabling Standard for Internet TV", Qualcomm Incorporated, Apr. 11, 2015, Retrieved from the Internet, https://www.w3.org/2011/09/webtv/slides/W3C-Workshop.pdf, 30 pgs.

3GPP TS 26.247, V10.1.0, 3rd Generation Partnership Project; Technical Specification Group Services and System Aspects Transparent end-to-end Packet-switches Streaming Services (PSS); Nov. 2011, 112 pages.

Chinese Patent Application 201180060590.1 office action dated Aug. 6, 2015, 11 pgs.

Examination report for GB1308663.2, dated May 18, 2016, 3 pgs.

Extended European Search Report for European Application No. 21208230.9, Search completed Feb. 18, 2022, dated Mar. 1, 2022, 15 Pgs.

Filed Application and Filing Receipt for U.S. Appl. No. 61/359,748, Application filed Jun. 29, 2010, Receipt mailed Jul. 13, 2010, 38 pages.

Great Britain Application GB1308663.2 search report dated Jan. 5, 2017, 1 pg.

ISO/IEC 14496-12 Information technology—Coding of audio-visual objects—Part 12: ISO base media file format, Amendment 3: DASH support and RTP reception hint track processing, 2011, 44 pgs.

ISO/IEC CD 23001-6 MPEG systems technologies Part 6: Dynamic adaptive streaming over HTTP (DASH), Oct. 15, 2010, 70 pgs.

ISO/IEC DIS 23009-1, Information technology—Dynamic adaptive streaming over HTTP (DASH)—Part 1: Media presentation description and segment formats, dated Aug. 30, 2011, 132 pgs.

ISO/IEC JTC1/SC29/WG11, MPEG/M18620, Oct. 2010, Text of ISO/IEC 23001-6: Dynamic adaptive streaming over HTTP (DASH), 72 pgs.

ISO/IEC JTC1/SC29/WG11, MPEG/N11578, Text of ISO/IEC 23001-6: Dynamic adaptive streaming over HTTP (DASH), Oct. 2010, 70 pgs.

ISO/IEC JTC1/SC29-WG11—Coding of Moving Pictures and Audio, MPEG2010/M18692, Jan. 2010, 10 pgs.

Search Report for Canadian patent application 2,816,621, dated Oct. 30, 2014, 6 pgs.

Search report for European Patent Application 11838186.2, dated Jul. 13, 2017, 6 pgs.

"Pixel aspect ratio—Wikipedia", Nov. 24, 2010, pp. 1-8.

\* cited by examiner

```
<?xml version="1.0" encoding="utf 8"?>
<smil xmlns="http://www.w3.org/ns/SMIL" version="3.0" baseProfile="Language">
<head />
```

PROFILE MSG 500

501

`<body>`

510

```
Trick Play -> video id="level3"
```

502
```
<video id="level1" systemBitrate="400000" width="768" height="432">
    <param name="vbv" value="3200000" valuetype="data" />
    <param name="mime" value="V_MPEG4/ISO/AVC" valuetype="data" />
</video>
```

504
```
<video id="level2"   systemBitrate="600000" width="768" height="432">
    <param name="vbv" value="4800000" valuetype="data" />
    <param name="mime" value="V_MPEG4/ISO/AVC" valuetype="data" />
</video>
```

505
```
<video id="level3"   systemBitrate="150000" width="768" height="432">
    <param name="mime" value="V_MPEG4/ISO/AVC" valuetype="data" />
</video>
```

```
    </switch>
   </excl>
```
506
```
<audio id ="audio1" xml:lang="und">
    <param name="reservedBandwidth" value="192000" valuetype="data" />
    <param name="mime" value="A_AAC" valuetype="data" />
</audio>
```

```
</body>
</smil>
```

FIG. 5

```xml
<?xml version="1.0" encoding="utf-8"?>
<smil xmlns="http://www.w3.org/ns/SMIL" version="3.0" baseProfile="Tiny">
<head />
```
                                                    ~ 601
```xml
<body>
  <excl>                        PLAYLIST MSG 600
    <seq>
602   <video id="level1" src="http://10.180.14.232/l140.mkv" clipBegin ="40" clipEnd = "42">
        <param name="mediaSize" value="3200" valuetype="data" />
      </video>

604   <video id="level1" src="http://10.180.14.232/l142.mkv" clipBegin="42" clipEnd="44">
        <param name="mediaSize" value="2354" valuetype="data" />
      </video>

606   <video id="level1" src="http://10.180.14.232/l144.mkv" clipBegin="44" clipEnd="46">
        <param name="mediaSize" value="3750" valuetype="data" />
      </video>

608   <video id="level1" src="http://10.180.14.232/l146.mkv" clipBegin="46" clipEnd="48">
        <param name="mediaSize" value="4521" valuetype="data" />
      </video>
    </seq>
  </excl>
  <seq>           610
      <audio id="audio1" src="http://10.180.14.232/a140.mkv" clipBegin ="40" clipdEnd="42">
        <param name="mediaSize" value="764" valuetype="data" />
      </audio>
  </seq>
</body>
</smil>
```

FIG. 6 ued as U.S. Pat. No. 9,712,890 on Jul. 18, 2017,
NETWORK VIDEO STREAMING WITH TRICK PLAY BASED ON SEPARATE TRICK PLAY FILES

CROSS-REFERENCE TO RELATED APPLICATION

The current application is a continuation of U.S. patent application Ser. No. 15/651,817 entitled "Network Video Streaming with Trick Play Based on Separate Trick Play Files" to Shivadas et al., filed Jul. 17, 2017, which is a continuation of U.S. patent application Ser. No. 14/810,345 entitled "Network Video Streaming with Trick Play Based on Separate Trick Play Files" to Shivadas et al., filed Jul. 27, 2015 and issued as U.S. Pat. No. 9,712,890 on Jul. 18, 2017, which is a continuation of U.S. patent application Ser. No. 13/905,852 entitled "Network Video Streaming with Trick Play Based on Separate Trick Play Files" to Shivadas et al., filed May 30, 2013 and issued as U.S. Pat. No. 9,094,737 on Jul. 28, 2015, the disclosures of which are hereby incorporated by reference in their entireties.

BACKGROUND

Distribution of multimedia video (also referred to herein as "media" and/or "program(s)"), such as movies and the like, from network services to a client device, may be achieved through adaptive bitrate streaming of the video. Prior to streaming, the video may be encoded at different bitrates and resolutions into multiple bitrate streams that are stored in the network services. Typically, each of the bitstreams includes time-ordered segments of encoded video.

Adaptive bitrate streaming includes determining an available streaming bandwidth at the client device, and then downloading a selected one of the different bitrate streams from the network services to the client device based on the determined available bandwidth. While streaming, the client device downloads and buffers the successive encoded video segments associated with the selected bitstream. The client device decodes the buffered encoded video segments to recover the video therein, and then plays back the recovered video on the client device, e.g., in audio-visual form.

In normal playback, the client device plays back the video recovered from each of the buffered segments in the order in which the video was originally encoded, i.e., in a forward direction. The client device may offer playback modes or features in addition to normal playback. Such additional playback features may include rewind, fast forward, skip, and so on, as is known.

The additional playback features are referred to herein as trick play features. In order to implement trick play features, such as rewind, the client device requires access to video that has already been played. Therefore, the client device may be required to store large amounts of already downloaded and played video in order to meet the demands of a selected trick play feature. However, many client devices, especially small, hand-held devices, have limited memory capacity and, therefore, may be unable to store the requisite amount of video.

BRIEF DESCRIPTION OF THE DRAWINGS

FIG. 5 is an example Profile message used in streaming.

FIG. 6 is an example Playlist message used in streaming.

Figure 1:
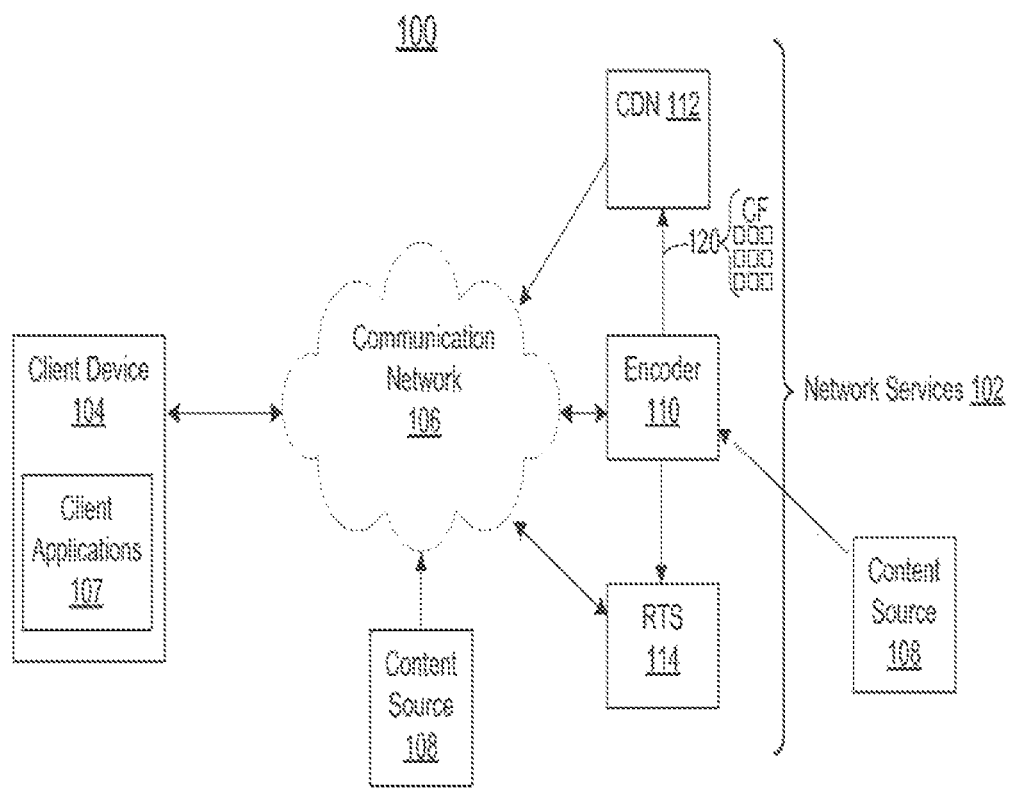
FIG. 1 is a block diagram of an example network environment that supports adaptive bitrate streaming of multimedia content, such as video, with trick play features.

In the drawings, the leftmost digit(s) of a reference number identifies the drawing in which the reference number first appears.

DETAILED DESCRIPTION

| | |
|---|---|
| 1 | Network Environment |
| 2 | Container Files-Streaming Sources |
| 2.1 | Encoded Video Frame Structure |
| 3 | Sequence Diagram |
| 3.1 | Start-up |
| 3.2 | Normal Streaming and Playback |
| 3.3 | Trick Play |
| 4 | Profile and Playlist Messages |
| 4.1 | Profile Message |
| 4.2 | Playlist Message |
| 5 | Method Flowcharts |
| 5.1 | Network Side |
| 5.2 | Client Side |
| 6 | Systems |

1 Network Environment

FIG. 1 is a block diagram of an example network environment 100 that supports adaptive bitrate streaming of multimedia content with trick play features. Network services 102 encode multimedia content, such as video, into multiple adaptive bitrate streams of encoded video and a separate trick play stream of encoded video to support trick play features. The trick play stream may be encoded at a lower encoding bitrate and a lower frame than each of the adaptive bitrate streams. The adaptive bitrate and trick play streams are stored in network services 102. For normal content streaming and playback, a client device 104 downloads a selected one of the adaptive bitrate streams from network services 102 for playback at the client device. When a user of client device 104 selects a trick play feature, such as rewind, the client device 104 downloads the trick play stream from network services 102 for trick play playback.

Environment 100 supports trick play features in different adaptive bitrate streaming embodiments, including on-demand streaming, live streaming, and real-time streaming embodiments. On-demand streaming includes encoding the content of a program from start to end in its entirety and then, after the entire program has been encoded, streaming, i.e., downloading, the encoded program to a client device. An example of on-demand streaming includes streaming a movie from a Video-on-Demand (VOD) service to a client device.

Live streaming includes encoding successive blocks of live content, i.e., a live program, as they are received from a content source, and then streaming each encoded block as it becomes available for download. Live streaming may include streaming live scenes, i.e., video, captured with a video camera.

Real-time streaming is similar in most aspects to live streaming, except that the input to real-time streaming is not a live video feed. Rather, the input, or source, may include successive encoded blocks, or input blocks, that have a format not suitable for streaming (e.g., for a given system) and must, therefore, be decoded and re-encoded (i.e., transcoded) into an encoded format that is suitable for streaming (in the given system). Real-time streaming handles the successive incompatible input blocks similar to the way live streaming handles the successive blocks of live content.

Network environment 100 is now described in detail. Network environment 100 includes server-side or network services 102 (also referred to simply as "services 102") and client-side device 104. Network services 102 may be implemented as Internet cloud-based services. Network services 102 interact and cooperate with each other, and with client device 104, to manage and distribute, e.g., stream, multimedia content from content sources 108 to the client devices, over one or more communication network 106, such as the Internet. Network services 102 communicate with each other and with client devices 104 using any suitable communication protocol, such as an Internet protocol, which may include Transmission Control Protocol/Internet Protocol (TCP/IP), Hypertext Transfer Protocol (HTTP), etc., and other non-limiting protocols described herein.

Content sources 108 may include any number of multimedia content sources or providers that originate live and/or pre-recorded multimedia content (also referred to herein simply as "content"), and provide the content to services 102, directly, or indirectly through communication network 106. Content sources 108, such as Netflix®, HBO®, cable and television networks, and so on, may provide their content in the form of programs, including, but not limited to, entertainment programs (e.g., television shows, movies, cartoons, news programs, etc.), educational programs (e.g., classroom video, adult education video, learning programs, etc.), and advertising programs (e.g., commercials, infomercials, or marketing content). Content sources 108, such as, e.g., video cameras, may capture live scenes provide the resulting real-time video to services 102. Content sources may also include live broadcast feeds deployed using protocols such as Real-time Transport Protocol (RTP), and Real-time Messaging Protocol (RTMP).

Network services 102 include, but are not limited to: an encoder 110 to encode content from content sources 108; a content delivery network (CDN) 112 (also referred to as a "download server 112") to store the encoded content, and from which the stored, encoded content may be streamed or downloaded to client device 104; and a real-time service (RTS) 114 (also referred to as a "real-time server (RTS) 114") to (i) control services 102, and (ii) implement an RTS streaming control interface through which client device 104 may initiate and then monitor both on-demand, live, and real-time streaming sessions. Each of services 102 may be implemented as one or more distinct computer servers that execute one or more associated server-side computer program applications suited to the given service.

Encoder 110 may be implemented as a cloud encoder accessible over communication network 106. Encoder 110 encodes content provided thereto into a number of alternative bitstreams 120 (also referred to as encoded content) to support adaptive bitrate streaming of the content. For increased efficiency, encoder 110 may be implemented as a parallel encoder that includes multiple parallel encoders. In such an embodiment, encoder 110 divides the content into successive blocks or clips each of a limited duration in time. Each block may include a number of successive picture frames, referred to collectively as a group of pictures (GOPs). Encoder 110 encodes the divided blocks or GOPs in parallel to produce alternative bitstreams 120. Encoder 110 may also include transcoders to transcode input files from one encoded format to another, as necessary.

Alternative bitstreams 120 encode the same content in accordance with different encoding parameters/settings, such as at different encoding bitrates, resolutions, frame rates, and so on. In an embodiment, each of bitstreams 120 comprises a large number of sequential (i.e., time-ordered) files of encoded content, referred to herein as container files (CFs), as will be described further in connection with FIG. 2.

After encoder 110 has finished encoding content, e.g., after each of the content blocks is encoded, the encoder uploads the encoded content to CDN 112 for storage therein. CDN 112 includes one or more download servers (DSs) to store the uploaded container files at corresponding network addresses, so as to be accessible to client device 104 over communication network 106.

RTS 114 acts as a contact/control point in network services 102 for client device 104, through which the client device may initiate and then monitor its respective on-demand, live, and real-time streaming sessions. To this end, RTS 114 collects information from services 102, e.g., from encoder 110 and CDN 112, that client device 104 may use to manage its respective streaming sessions, and provides the collected information to the client device via messages (described below) when appropriate during streaming sessions, thus enabling the client device to manage its streaming sessions. The information collected by RTS 114 (and provided to client device 104) identifies the encoded content, e.g., the container files, stored in CDN 112, and may include, but is not limited to, network addresses of the container files stored in the CDN, encoding parameters use to encode the container files, such as their encoding bitrates, resolutions, and video frame rates, and file information, such as file sizes, and file types.

Client device 104 may be capable of wireless and/or wired communication with network services 102 over communication network 106, and includes processing, storage, communication, and user interface capabilities sufficient to provide all of the client device functionality described herein. Such functionality may be provided, at least in part, by one or more client applications 107, such as computer programs, that execute on client device 104. Client applications 107 may include:
 a. a Graphical User Interface (GUI) through which a user of the client device may interact with and request services from corresponding server-side applications hosted in services 102. The GUI may also present trick play feature selections to the user, such as rewind and fast forward. Under user control through the GUI, client device 104 may request/select (i) programs to be streamed from services 102, and (ii) trick play features to control trick play playback of the streamed programs;
 b. streaming and playback applications to stream/download the selected programs from the services, and playback, i.e., present, the streamed programs on client device 104, under user control, through the GUI; and
 c. a trick play application, integrated with the GUI and the streaming and playback applications, to implement the trick play features as described herein.

2 Container Files—Streaming Sources

As described above, encoder 110 encodes multimedia content from content sources 108, and CDN 112 stores the encoded content. To support adaptive bitrate streaming and trick play features, encoder 110 encodes the content at multiple encoding levels, where each level represents a distinct combination of an encoding bitrate, a video resolution (for video content), and a video frame rate, to produce (i) multiple adaptive bitrate streams for the content, and (ii) a trick play stream for the content. The multiple streams may be indexed according to their respective encoding levels. While streaming the encoded program from CDN 112, client device 104 may switch between streams, i.e., levels (and thus encoded bitrates and resolutions), according to conditions at the client device. Also, while streaming the encoded program, client device 104 may download portions of the trick play stream from CDN 112 to implement trick play features in the client device.

Figure 2:
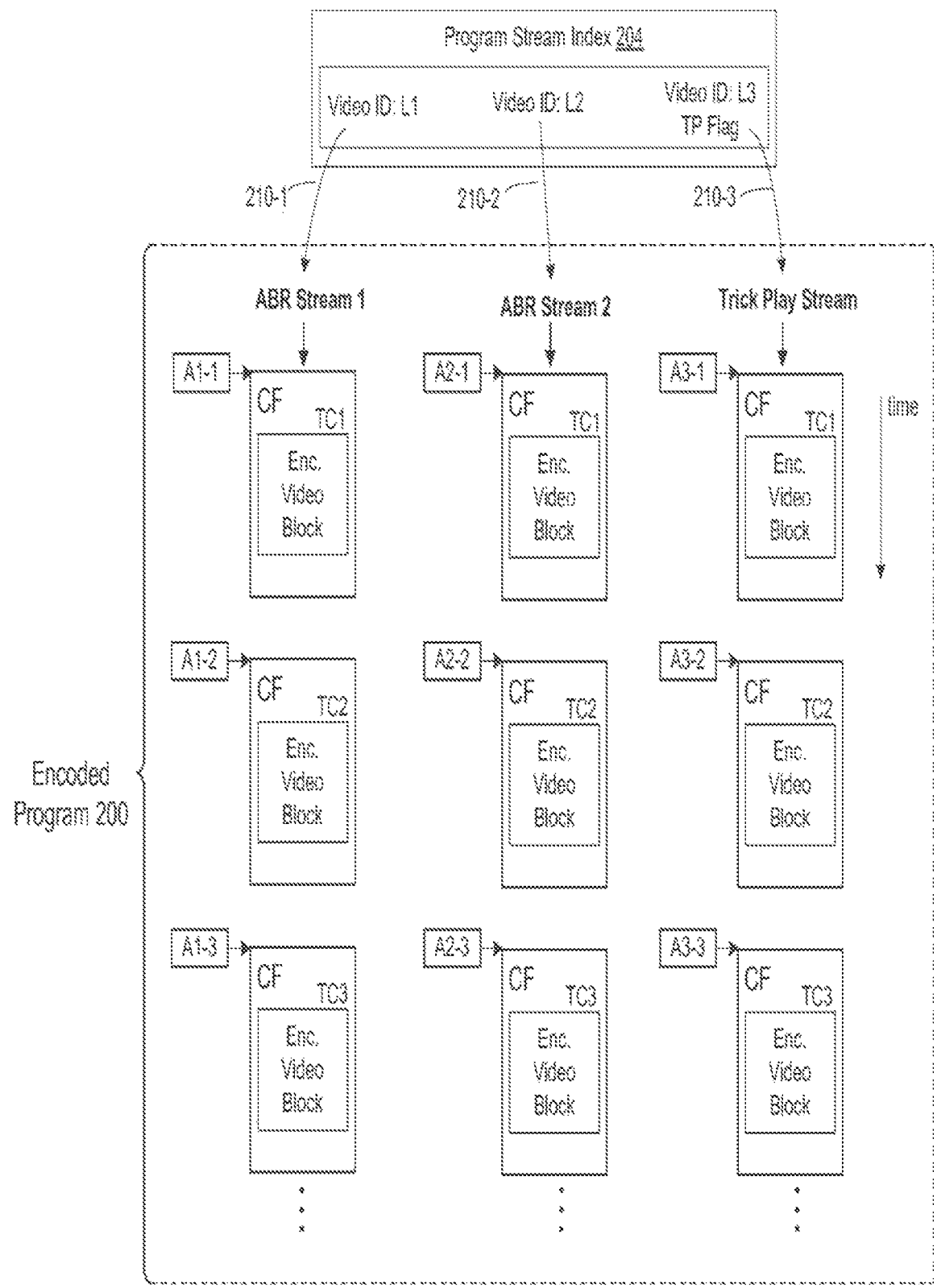
FIG. 2 is an illustration of an example encoded multimedia video program generated by and stored in network services of FIG. 1.

FIG. 2 is an illustration of an example encoded multimedia video program 200 generated by encoder 110 and stored in CDN 112. Encoded video program 200 includes:
 a. two encoded adaptive bitrate (ABR) video streams 1, 2 encoded at corresponding encoding levels L1, L2 and available for adaptive bitrate streaming; and
 b. a trick play stream encoded at an encoding level L3. The trick play stream corresponds to, i.e., encodes the same video as, the two ABR streams 1, 2.

Each of encoding levels L1-L3 corresponds to a distinct combination of an encoding bitrate (Rate), a video resolution (Res), and a video frame rate (FR). In the example, encoding levels L1, L2, L3 correspond to encoder settings Rate1/Res1/FR1, Rate2/Res2/FR2, Rate3/Res3/FR3, respectively. In an embodiment, the encoding bitrate Rate3 and the video frame rate FR3 used to encode the trick play stream are less than the encoding bitrates Rate1, Rate2 and the frame rates FR1, FR2, respectively, used to encode adaptive bitrate streams 1, 2.

Although the example of FIG. 2 includes only two encoding levels for the ABR streams, in practice, an encoded video program typically includes many more than two levels of encoding for ABR streaming, such as 8 to 15 levels of encoding.

Each of streams 1-3 includes a distinct, time-ordered, sequence of container files CF (i.e., successive container files CF), where time is depicted in FIG. 2 as increasing in a downward vertical direction. Each of the successive container files CF, of each of streams 1-3, includes (i.e., encodes) a block or segment of video (also referred to herein as an encoded video block or segment) so that the successive container files encode successive contiguous encoded video blocks. Each of container files CF includes a time code TC to indicate a duration of the video encoded in the block of the container file, and/or a position of the container file in the succession of container files comprising the corresponding stream. The time code TC may include a start time and end time for the corresponding encoded video block. In an example in which each of container files CF encodes two seconds of video, time codes TC1, TC2, and TC3 may represents start and end times of 0s (seconds) and 2s, 2s and 4s, and 4s and 6s, respectively, and so down the chain of remaining successive container files.

The encoded blocks of the container files CF in a given stream may encode the same content (e.g., video content) as corresponding blocks in the other streams. For example, the stream 1 block corresponding to time code TC1 has encoded therein the same video as that in the stream 2 block corresponding to TC1. Such corresponding blocks encode the same content and share the same time code TC, i.e., they are aligned or coincide in time.

In an embodiment, a program stream index 204 may be associated with encoded video program 200 to identify each of the streams therein (e.g., the ABR streams 1, 2, and the trick play stream). RTS 114 may create (and store) program stream index 204 based on the information collected from encoder 110 and CDN 112, as described above in connection with FIG. 1. Then, during a live streaming session, for example, RTS 114 may provide information from program stream index 204 to client device 104 so as to identify appropriate container file addresses to the client device. Program stream index 204 may include:
 a. address pointers (e.g., network addresses, such as Uniform Resource Locators (URLs)) 210-1, 210-2, 210-3 to corresponding streams 1, 2, and the trick play stream;
 b. encoder parameters/settings associated with the encoded streams including, but not limited to, encoding levels L1, L2, L3 (also referred to as "Video ID" in FIG. 2, and including the encoding bitrates and resolutions Rate1/Res1, Rate2/Res2, Rate3/Res3), encoding techniques/standards, and file types and sizes of the container files CF, and
 c. a trick play flag (TP flag) associated with URL 210-3 that, when set, indicates the associated stream is a trick play stream.

Address pointers 210-1, 210-2, 210-3 may point to respective lists of addresses A1, A2, A3 of the container files CF comprising each of streams 1, 2, 3. Address lists A1, A2, A3 may each be represented as an array or linked list of container file network addresses, e.g., URLs. Accordingly, access to the information in program stream index 204 results in possible access to all of the container files associated with streams 1, 2, 3.

Although each of container files CF depicted in FIG. 2 represents a relatively small and simple container structure, larger and more complicated container structures are possible. For example, each container file may be expanded to include multiple clusters of encoded media, each cluster including multiple blocks of encoded media, to thereby form a larger container file also suitable for embodiments described herein. The larger container files encode an equivalent amount of content as a collection of many smaller container files.

Container files may encode a single stream, such as a video stream (as depicted in FIG. 2), an audio stream, or a text stream (e.g., subtitles). Alternatively, each container file may encode multiple multiplexed streams, such as a mix of video, audio, and text streams. In addition, a container file may encode only a metadata stream at a relatively low bitrate.

In embodiments: the container files may be Matroska (MKV) containers based on Extensible Binary Meta Language (EBML), which is a derivative of Extensible Binary Meta Language (XML), or files encoded in accordance with the Moving Picture Experts Group (MPEG) standard; the program stream index may be provided in a Synchronized Multimedia Integration Language (SMIL) format; and client device 104 may download container files from CDN 114 over networks 106 using the HTTP protocol. In other embodiments, the container file formats may include OGG, flash video (FLV), Windows Media Video (WMV), or any other format.

Exemplary, non-limiting, encoding bitrates for different levels, e.g., levels L1, L2, L3 may range from below 125 kilo-bits-per-second (kbps) up to 15,000 kbps, or even higher, depending on the type of encoded media (i.e., content). Video resolutions Res 1-Res 4 may be equal to or different from each other.

The container files may support adaptive streaming of encoded video programs across an available spectrum bandwidth that is divided into multiple, i.e., n, levels. Video having a predetermined video resolution for each level may be encoded at a bitrate corresponding to the bandwidth associated with the given level. For example, in DivX® Plus Streaming, by Rovi Corporation, the starting bandwidth is 125 kbps and the ending bandwidth is 8400 kbps, and the number n of bandwidth levels is eleven (11). Each bandwidth level encodes a corresponding video stream, where the maximum encoded bitrate of the video stream (according to a hypothetical reference decoder model of the video coding standard H.264) is set equal to the bandwidth/bitrate of the given level. In DivX® Plus Streaming, the 11 levels are encoded according to 4 different video resolution levels, in the following way: mobile (2 levels), standard definition (4 levels), 720p (2 levels), and 1080p (3 levels).

2.1 Encoded Video Frame Structure

Figure 3A:
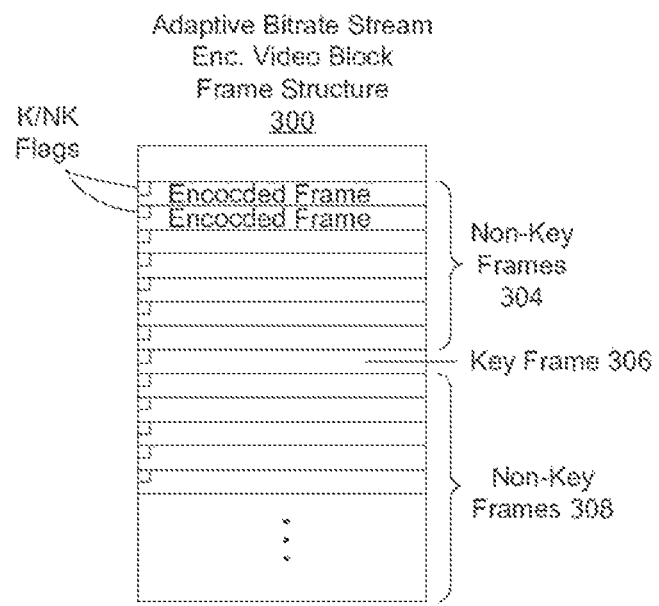
FIG. 3A is an illustration of an example adaptive bitrate frame structure of an encoded video block of FIG. 2.

FIG. 3A is an illustration of an example frame structure 300 of an encoded video block for container files from adaptive bitrate streams 1 and 2 of FIG. 2. Video encoding by encoder 110 includes capturing a number of successive picture frames, i.e., a GOP, at a predetermined video frame rate, and encoding each of the captured frames, in accordance with an encoding standard/technique, into a corresponding encoded video frame. Exemplary encoding standards include, but are not limited to, block encoding standards, such as H.264 and Moving Picture Experts Group (MPEG) standards. Collectively, the encoded video frames form an encoded video block, such as an encoded video block in one of container files CF. The process repeats to produce contiguous encoded video blocks.

The encoding process may encode a video frame independent of, i.e., without reference to, any other video frames, such as preceding frames, to produce an encoded video frame referred to herein as a key frame. For example, the video frame may be intra-encoded, or intra-predicted. Such key frames are referred to as I-Frames in the H.264/MPEG standard set. Since the key frame was encoded independent of other encoded video frames, it may be decoded to recover the original video content therein independent of, i.e., without reference to, any other encoded video frames. In the context of streaming, the key frame may be downloaded from CDN 112 to client device 104, decoded independent of other encoded frames, and the recovered (decoded) video played back, i.e., presented, on the client device.

Alternatively, the encoding process may encode a video frame based on, or with reference to, other video frames, such as one or more previous frames, to produce an encoded video frame referred to herein as a non-key frame. For example, the video frame may be inter-encoded, i.e., inter-predicted, to produce the non-key frame. Such non-key frames include P-Frames and B-frames in the H.264/MPEG standard set. The non-key frame is decoded based on one or more other encoded video frames, e.g., key-frames, reference frames, etc. In the context of streaming, the non-key frame may be downloaded from CDN 112 to client device 104, decoded based on other encoded frames, and the recovered video played back.

With reference again to FIG. 3A, frame structure 300 of the encoded video block for container files in the adaptive bitrate streams includes, in a time-ordered sequence, a first set of successive non-key frames 304, a key frame 306, and a second set of successive non-key frames 308. Accordingly, key frame 306 is interspersed among the encoded video frames of the encoded video block. The position of key frame 306 relative to the non-key frames in block 300 may vary, e.g., the position may be at the top, the middle, the bottom, or elsewhere in the block. Moreover, multiple key frames may be interspersed among the encoded video frames of the encoded video block, and separated from each other by multiple non-key frames.

A key/non-key (K/NK) flag associated with each of the frames 304, 306, and 308 indicates whether the associated frame is a key-frame or a non-key frame. Each of the key and the non-key frames may include a predetermined number of bytes of encoded video.

In an example in which the encoded video block represented by frame structure 300 encodes 2 seconds of video captured at a video frame rate of 30 frames per second (fps), the frame structure includes 60 encoded video frames, which may include N (i.e., one or more) interspersed key frames, and 60-N non-key frames. Typically, the number of non-key frames exceeds the number of key frames.

Figure 3B:
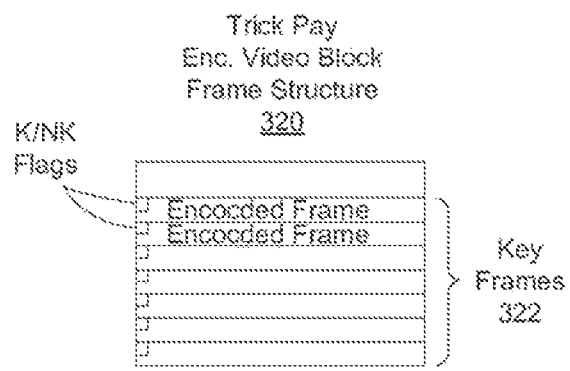
FIG. 3B is an illustration of an example trick play frame structure of an encoded video block of FIG. 2.

FIG. 3B is an illustration of an example frame structure 320 of an encoded video block for container files from the trick play stream of FIG. 2. Trick play frame structure 320 includes, in a time-ordered sequence, key frames 322. In other words, trick play frame structure 320 includes only key frames, i.e., key frames without non-key frames.

In the example in which the encoded video block represented by frame structure 300 encodes 2 seconds of video captured at a video frame rate of 30 frames per second (fps), the encoded video block represented by frame structure 320 also encodes 2 seconds of video. However the video frame rate for structure 320 is reduced to 5 fps, which yields 10 encoded video frames (key frames) every 2 seconds.

3 Sequence Diagram

Figure 4:
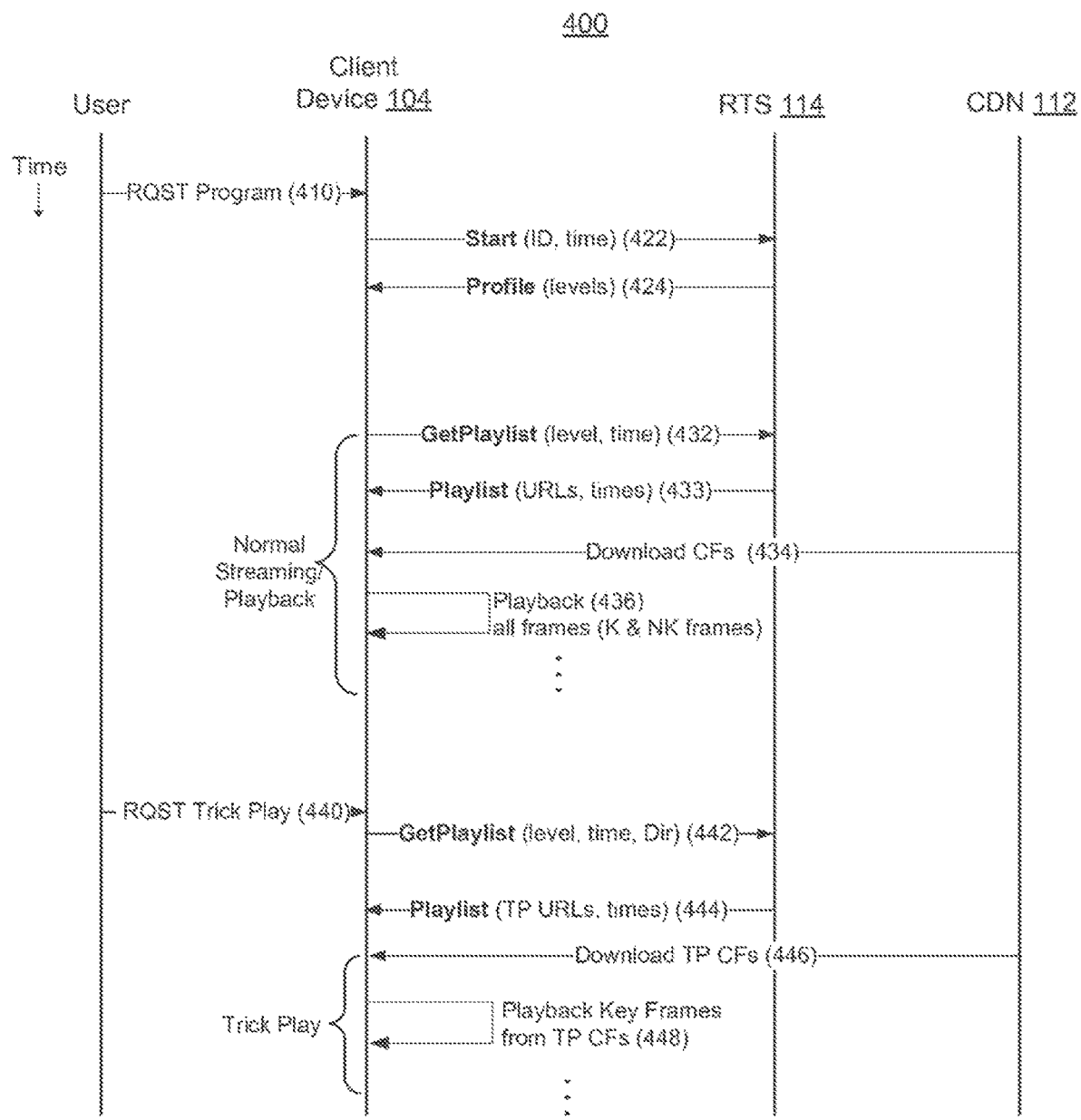
FIG. 4 is a sequence diagram of example high-level interactions between network services and a client device used to initiate streaming, implement normal streaming and playback, and implement trick play features in streaming embodiments.

FIG. 4 is a sequence diagram of example high-level interactions 400 between network services 102 and client device 104 used to initiate, i.e., start-up, streaming, implement normal streaming and playback, and implement trick play features in on-demand, live, and real-time streaming embodiments. Interactions 400 progress in time from top-to-bottom in FIG. 4, and are now described in that order. It is assumed that prior to startup, encoder 110 is in the process of, or has finished, encoding video content into multiple adaptive bitrate streams and a corresponding trick play stream, and storing the resulting container files in CDN 112 for subsequent download to client device 104.

3.1 Start-Up

At 410, a user of client device 104 selects content, such as a video program, to be streamed using the client device GUI.

At 422, client device 104 sends a "Start" message (also referred to as a "begin playback" message) to RTS 114 to start a streaming session. The Start message includes an identifier (ID) of the content to be streamed and a current time stamp. The ID identifies content from a content source that is to be streamed to client 104, and may indicate, e.g., a channel, program name, and/or source originating the content to be streamed. The current time stamp (also referred to as "current time") indicates a current time, such as a Universal Time Code (UTC). The UTC may be acquired from any available UTC time service, as would be appreciated by those or ordinary skill in the relevant arts.

As mentioned above, it is assumed that at the time the Start message is issued, the content identified therein has already been encoded and is available for streaming, e.g., for video-on-demand streaming, or will begin to be encoded shortly after the time of the Start message, e.g., for live and real-time streaming. It is also assumed that RTS 114 has collected, or will be collecting, the information related to the encoded program from encoder 110 or CDN 115, such as a program stream index, e.g., program stream index 204, sufficient to identify the identified content in network services 102.

At 424, in response to the Start message, RTS 114 sends an encoding profile message (referred to as a "Profile" message) to client 104. The Profile message lists different encoding profiles used to encode the identified content, e.g., as available from the program stream index for the identified content. Each of the profiles specifies encoding parameters/settings, including, but not limited to: content type (e.g., audio, video, or subtitle); an encoding level corresponding to an encoding bitrate, resolution, and video frame rate (e.g., levels L1, L2, L3); and a container file type, e.g., a Multipurpose Internet Mail Extensions (MIME) type. The Profile message also indicates which encoding level among the multiple encoding levels e.g., encoding level L3, represents or corresponds to a trick play stream.

In response to the Profile message, client device 104 selects an appropriate encoding level (e.g., an appropriate combination of an encoding bitrate and a resolution) among the levels indicated in the Profile message (not including the level indicating the trick play stream) for normal streaming and playback of the identified content. Client device 104 may determine the appropriate encoding level based on a communication bandwidth at the client device.

3.2 Normal Streaming and Playback

After startup, normal streaming and playback begins, as follows.

At 432, after client device 104 has selected the encoding level, the client device sends a GetPlaylist message to RTS 114 to request a list of any new container files that have been uploaded since the client device last downloaded container files (if any) from CDN 112. The GetPlaylist message includes selection criteria for uploaded container files, namely, a current time and the selected encoding level. The current time represents a time code associated with the last container file downloaded by client device 104 (if any) in the current streaming session.

In response to the GetPlaylist message, RTS 114:
 a. selects the uploaded container files, as identified to the RTS that meet the criteria specified in the GetPlaylist message. The selected, uploaded container files are those container files that have (i) a time code greater than the current time, and (ii) an encoding level that matches the level specified in the GetPlaylist message from the client device;
 b. generates a Playlist message identifying the selected container files;
 and
 c. at 433, sends the Playlist message to client device 104.

For each of the selected container files, the Playlist message includes the following information: the type of content encoded in the container file (e.g., video, audio, or subtitle); an address (e.g., URL) of the container file in CDN 112 (e.g., a subset of the addresses A1 or A2); a time code, e.g., a start time and an end time, associated with the content block encoded in the container file; and a file size of the container file.

At 434, in response to the Playlist message, client device 104 downloads container files from addresses in CDN 112 based on, i.e., as identified in, the Playlist message.

At 436, client device 104 decodes all of the key frames and the non-key frames of the encoded content block from each of the downloaded container files to recover the original content therein, and then presents the recovered content, whether in audio, visual, or in other form, on client device 104. The process of decoding the encoded content from the key and non-key frames and then presenting the recovered content on client device 104 is referred to as "normal playback" on the client device. In normal playback, the content recovered from successive downloaded container files is played back on client device 104 in a forward (play) direction, i.e., in an order of increasing time code. For example, with reference again to FIG. 2, the content is played back from container files CF in the time code order of 0 s-2 s, 2 s-4 s, 4 s-6 s, and so on. For normal playback, the decoded video frames are presented at a frame rate equal to the frame rate at which the video was original captured and encoded, e.g., at a rate of 30 fps.

The normal streaming and playback sequence repeats. Therefore, in summary, in the streaming and playback sequence, client device 104 periodically requests and downloads Playlist messages, downloads container files indicated in the Playlist messages, and plays back the content from the downloaded container files in the forward direction.

3.3 Trick Play

At any time during the normal streaming and playback sequence, the user may select a trick play (TP) feature through the GUI. Trick play features include, but are not limited to, rewind and fast forward, in which client device 104 rewinds and fast forwards through previously played back content.

At 440, assume the user selects the rewind trick play feature while client device 104 is performing the normal playback of content.

At 442, in response to the rewind request, client device 104 sends a GetPlaylist message to RTS 114 to solicit appropriate trick play video (container files) from network services 102. Therefore, in this case, the GetPlaylist message may also be referred to as a "GetTrickPlayPlaylist" message. The GetPlaylist message sent at 442 includes the following trick play file selection criteria:
 a. a time (referred to as a "trick play time") when the user selected the trick play feature;
 b. the encoding level that was indicated in the Profile message (at 424) as corresponding to the trick play video (e.g., level 3 in the example of FIG. 2); and
 c. a trick play direction (depicted as "Dir" in FIG. 4) indicating rewind (RWD).

At 444, in response to the GetPlaylist message sent at 442, RTS 114 generates and sends a trick play Playlist message to client device 104. The trick play Playlist message identifies those container files from the trick play stream (e.g., the stream associated with encoding level L3 in the example of FIG. 2) that meet the selection criteria, namely, that are associated with (i) successive time code less than the trick play time because the trick play direction is RWD, and (ii) an encoding level that matches the specified level (e.g., encoding level L3). The Playlist message lists URLs of the appropriate trick play container files.

At 446, client device 104 downloads the trick play container files identified in the Playlist message from 444. For example, client device 104 downloads the trick play container files from their corresponding URLs.

At 448, client device 104 plays back video from the downloaded trick play container files, i.e., the client device decodes the key frames from each of the trick play container files and then presents the decoded video in a rewind play direction, i.e., in an order of decreasing time codes beginning with the trick play time.

The trick play sequence 442-448 repeats.

During trick play, the video from the key frames may be played back at a reduced video frame rate relative to that used for normal playback. For example, the trick play playback video frame rate may be 5 fps, instead of 30 fps.

Also, to implement a faster rewind, key frames may be skipped, e.g., every other key frame may be played back. In other words, only a subset of key frames in each of the downloaded trick play container files may be used in trick play playback.

The above described trick play sequence results when the user selects RWD at 440. Alternatively, the user may select fast forward (FFWD) at 440. The trick play sequence that results when the user selects FFWD is similar to that for RWD, except that the GetPlaylist message at 442 indicates FFWD instead of RWD. In response to the FFWD indication in the GetPlaylist message, at 444, RTS 114 returns a Playlist message identifying trick play files associated with successive time codes greater than (not less than) the trick play time. Then, at 448, client device 104 plays back the downloaded trick play files in the forward direction.

4 Profile and Playlist Messages
4.1 Profile Message

FIG. 5 is an example Profile message 500. In an embodiment, the Profile message format is in accordance with the World Wide Web Consortium (W3C) recommended Extensible Markup Language (XML) markup language, Synchronized Multimedia Integration Language (SMIL) 3.0 Tiny profile. This profile is well-suited to descriptions of web-based multimedia. However, other protocols may be used to format the Profile message.

Profile message 500 includes a header 501 to specify the base profile as SMIL 3.0 (Tiny), and a body including video encoding (VE) profiles 502, 504, 505 and an audio encoding (AE) profile 506. Profile message 500 corresponds to a requested program ID, such as encoded program 200 of FIG. 2, and includes information from the associated index, e.g., index 204. Each of VE profiles 502, 504, 505 specifies the following encoding settings or parameters:
  a. a content type, e.g., video;
  b. an encoding level "Video ID" (e.g., level 1=L2, level 2=L2, level 3=L3) with its corresponding
    i. encoding bitrate (e.g., Rate1, Rate2, or Rate3, such as a bitrate=400000 bps, 600000 bps, or 150000 bps), and
    ii. video resolution (e.g., Res1, Res2, or Res3) in terms of, e.g., pixel width and height dimensions (e.g., 768×432); and
  c. MIME type.

Similarly, AE profile 506 specifies:
  a. a content type, e.g., audio;
  b. an encoding bitrate/reserved bandwidth value (e.g., 192000); and
  c. a MIME type.

The Profile message may also include a video frame rate at which each level was encoded.

As mentioned above in connection with FIG. 4, Profile message 500 also includes a field 510 to indicate which of encoding profiles 502-505, if any, represents a trick play stream. In the example of FIG. 5, the stream associated with level 3 (similar to FIG. 2) is indicated as the trick play stream.

4.2 Playlist Message

FIG. 6 is an example Playlist message 600 generated in response to a GetPlaylist message selection criteria including a current time of 40 (seconds) and specifying a level 1 encoding level. Like the Profile message, the example Playlist message is formatted in accordance with SMIL 3.0.

Playlist message 600 includes a header 601 to specify the base profile as 3.0, and a body that includes sequential records or elements 602-610, each of which is defined as a seq element <seq>. In an embodiment, each seq element 602-610 corresponds to an uploaded container file. Using seq elements, RTS 114 is able to specify a sequence of real-time media streams for playback. A sequence tag is used with each element to indicate one of <video>, <audio> or <subtitle/text> encoded content for streaming. Elements 602-610 identify respective uploaded elements (e.g., container files) that meet the Playlist message criteria (i.e., encoding level 1 and a time code equal to or greater than 40). In the example of FIG. 6, elements 602-608 identify three container files containing successive or time-ordered two second blocks of encoded video. Element 610 identifies a container file containing a two second segment of encoded audio. Each of the Playlist message records 602-610 includes:
  a. a content type identifier (e.g., video or audio);
  b. a URL of the identified container file (e.g., src=http://10.180.14.232/I140.mkv). For example, the URLs correspond to container file addresses from the list of addresses A1 or A2 from FIG. 2;
  c. a time code in seconds (e.g., a start time and an end time, referred to as "ClipBegin" and "ClipEnd," respectively,) associated with the segment encoded in the identified container file. The example time codes for each of the container files are 40-42, 42-44, and 46-48); and
  d. a file size of the identified container file (e.g., 3200 kilobits).

5 Method Flowcharts
5.1 Network Side

Figure 7:
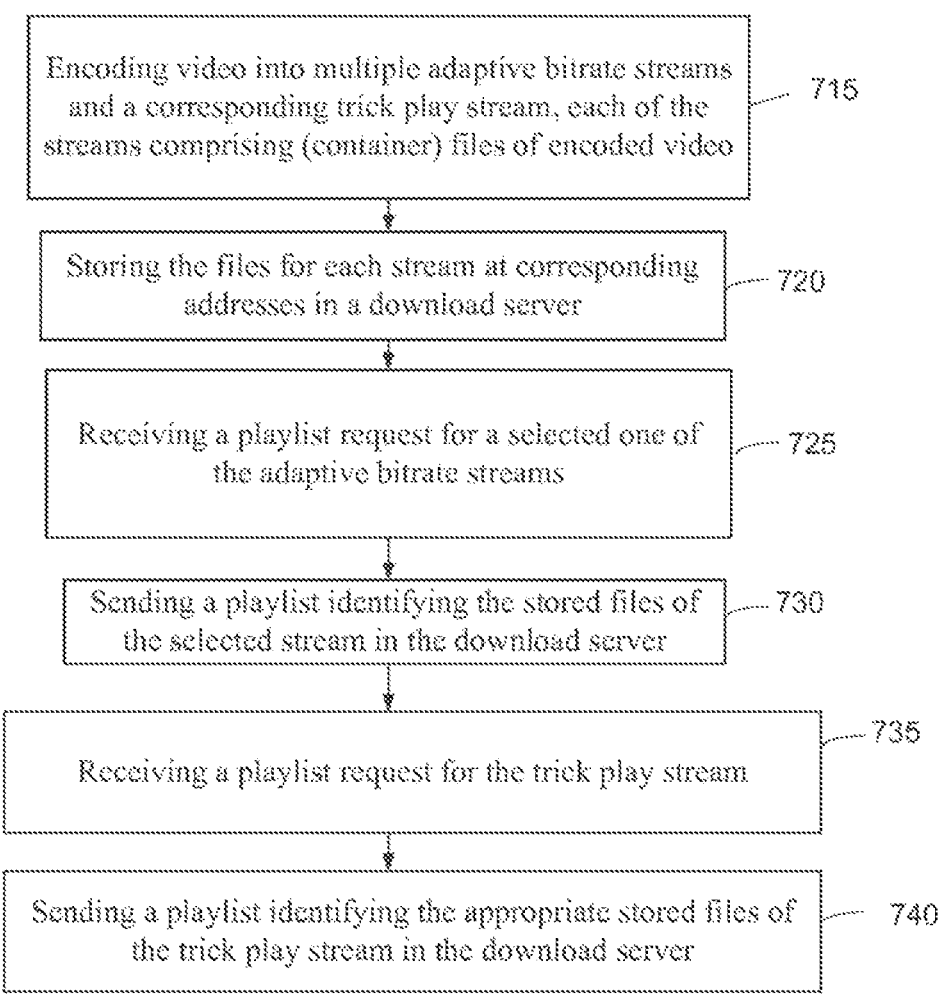
FIG. 7 is a flowchart of an example network-side method of multimedia content streaming with trick play support based on trick play files, which may be implemented in the network services of FIG. 1.

FIG. 7 is a flowchart of an example network-side method 700 of multimedia content streaming with trick play support based on trick play files, which may be implemented in network services 102. Method 700 may be executed in accordance with sequence 400 of FIG. 4. The multimedia content includes video, and may also include audio and/or text (e.g., subtitles). Method 700 may be implemented in any of the contexts of on-demand, live, and real-time streaming.

715 includes encoding video into (i) multiple adaptive bitrate streams, and (ii) a corresponding trick play stream in accordance with corresponding distinct sets of encoder settings or levels, such as an encoding bitrate, a resolution, and a video frame rate. Each of the streams comprises container files of encoded video associated with successive time codes.

720 includes storing (i) the container files for each stream at corresponding addresses, such as network addresses, e.g., URLs, in a download server, e.g., in CDN 114, and (ii) an index identifying the container files of each stream in RTS 114.

725 includes receiving a playlist request (e.g., a GetPlaylist message) from a client device, e.g., over a communication network, for a selected one of the adaptive bitrate streams. The playlist request includes container file selection criteria, including a current time, an encoding level.

730 includes sending, to the client device over the communication network, a playlist (e.g., a Playlist message) identifying the stored files of the selected stream that meet the selection criteria, i.e., that are associated with time codes greater than the current time. The playlist may list URLs where the identified container files are stored and sizes of the files.

735 includes receiving, from the client device, a playlist request (e.g., another GetPlaylist message) for the trick play stream corresponding to the selected stream. The trick play playlist request includes a trick play time code, a trick play encoding level, and a trick play direction, e.g., fast forward or rewind.

740 includes sending, to the client device, a trick play playlist (e.g., another Playlist message) identifying the stored files (e.g., URLs of the stored files) of the trick play stream that are associated with successive time codes that are (i) less than the trick play time if the trick play direction is rewind, and (ii) greater than the trick play time if the trick play direction is fast forward.

5.2 Client Side

Figure 8:
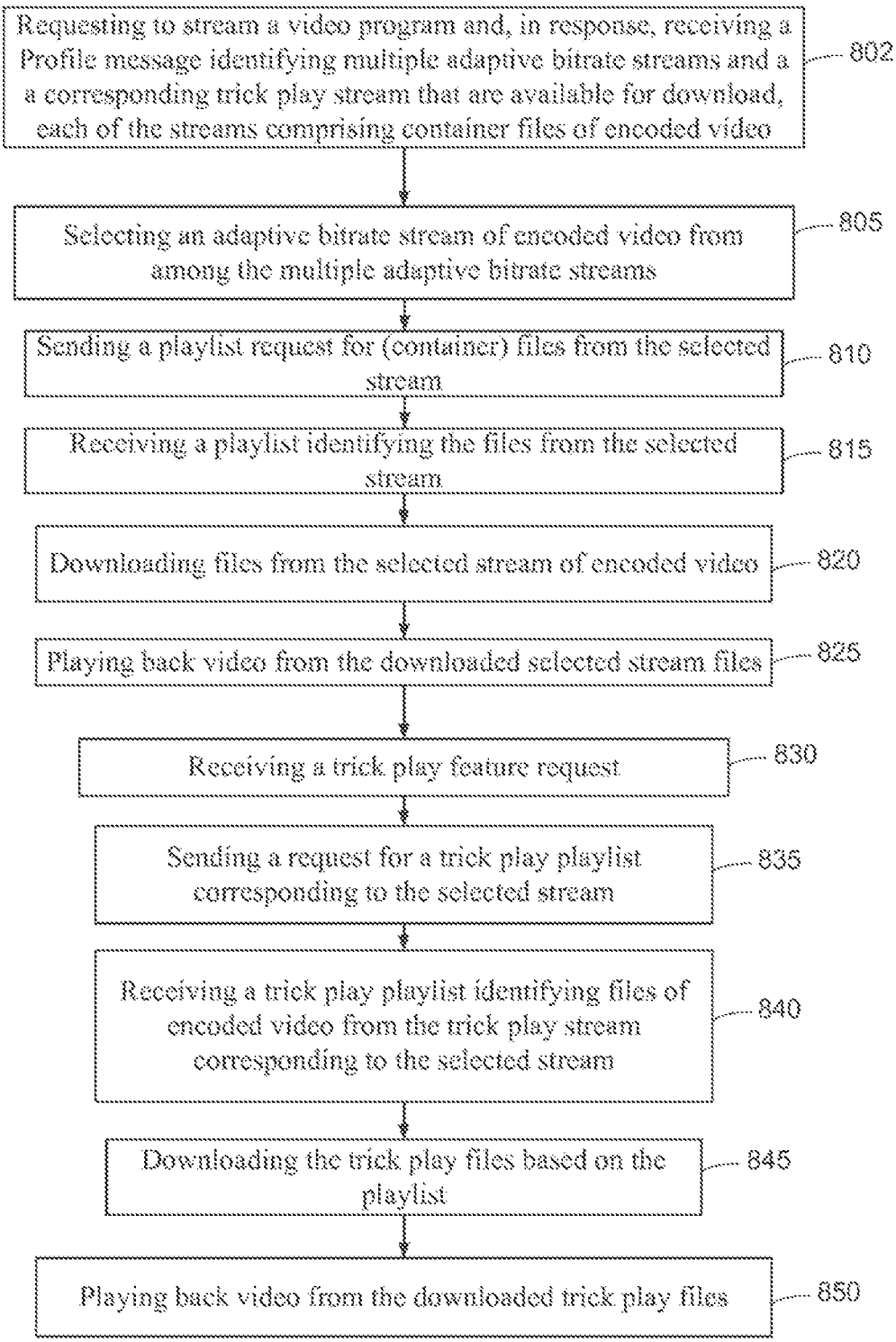
FIG. 8 is a flowchart of an example client-side method of multimedia content streaming with trick play support based on trick play files, which may be implemented in the client device of FIG. 1.

FIG. 8 is a flowchart of an example client-side method 800 of multimedia content streaming with trick play support based on trick play files, which may be implemented in client device 104. Method 800 is a client side method complementary to network side method 700. Method 800 may be executed in accordance with sequence 400 of FIG. 4. The multimedia content includes video, and may also include audio and/or text (e.g., subtitles). Method 700 may be implemented in any of the contexts of on-demand, live, and real-time streaming.

Together, operations 802-815 described below are considered precursor, or initialization, operations that lead to subsequent downloading of an adaptive bitrate stream.

802 includes requesting to stream a video program from network services over a communication network and, in response, receiving a Profile message over the communication network identifying multiple adaptive bitrate streams of encoded video and a trick play stream of encoded video that are stored in, and available for streaming from, network services. The streams may be identified according to their respective encoding levels (e.g., encoding bitrate, resolution, frame rate, etc.). Each of the streams comprises container files of the encoded video. The container files of each stream are associated with successive time codes.

805 includes selecting an adaptive bitrate stream from among the multiple adaptive bitrate streams. A client device may select an adaptive bitrate stream based an available communication bandwidth.

810 includes sending, to the network services over the communication network, a playlist request (e.g., a GetPlaylist message) for (container) files from the selected stream. The playlist request includes file selection criteria that includes a current time and specifies an encoding level corresponding to, e.g., an encoding bitrate and a resolution, of the selected stream.

815 includes receiving, from the network services over the communication network, a playlist (e.g., a Playlist message) identifying the files from the selected stream that meet the file selection criteria, i.e., that are associated with successive time codes greater than the current time.

820 includes downloading, from the network services over the communication network, files of encoded video from the selected stream as identified in the playlist, e.g., from URLs listed in the playlist.

825 includes playing back video from the downloaded files in an order of increasing time codes. This includes playing back video from both key and non-key frames at a normal video frame rate, such as 30 fps.

830 includes receiving a trick play feature request, such as a video rewind request, from a user of the client device. Next operations 835-850 are performed in response to the trick play request received at 830.

835 includes sending, to the network services over the communication network, a trick play playlist request (e.g., a GetTrickPlayPlaylist message) for appropriate trick play files from the trick play stream corresponding to the selected stream. The request includes a trick play time (corresponding to a time when the user selected the trick play feature), a trick play encoding level as indicated in the Profile message received earlier by the client device at 802 (e.g., level L3), and a trick play direction (e.g., rewind or fast forward).

840 includes receiving, from the network services over the communication network, a trick play playlist (e.g., a Playlist message) identifying files from the trick play stream that meet the file selection criteria, i.e., that are associated with successive time codes (i) less than the trick play time if the direction is rewind, and (ii) greater than the trick play time if the direction is fast forward.

845 includes downloading the trick play files identified in the playlist from 840, e.g., from URLs listed in the playlist.

850 includes playing back video from the downloaded files in either the rewind direction, i.e., in an order of decreasing time codes, or in the forward direction, as appropriate. This includes playing back video only from key frames at a trick play video frame rate, such as 5 fps, which is reduced relative to the normal frame rate.

6 Systems

Figure 9A:
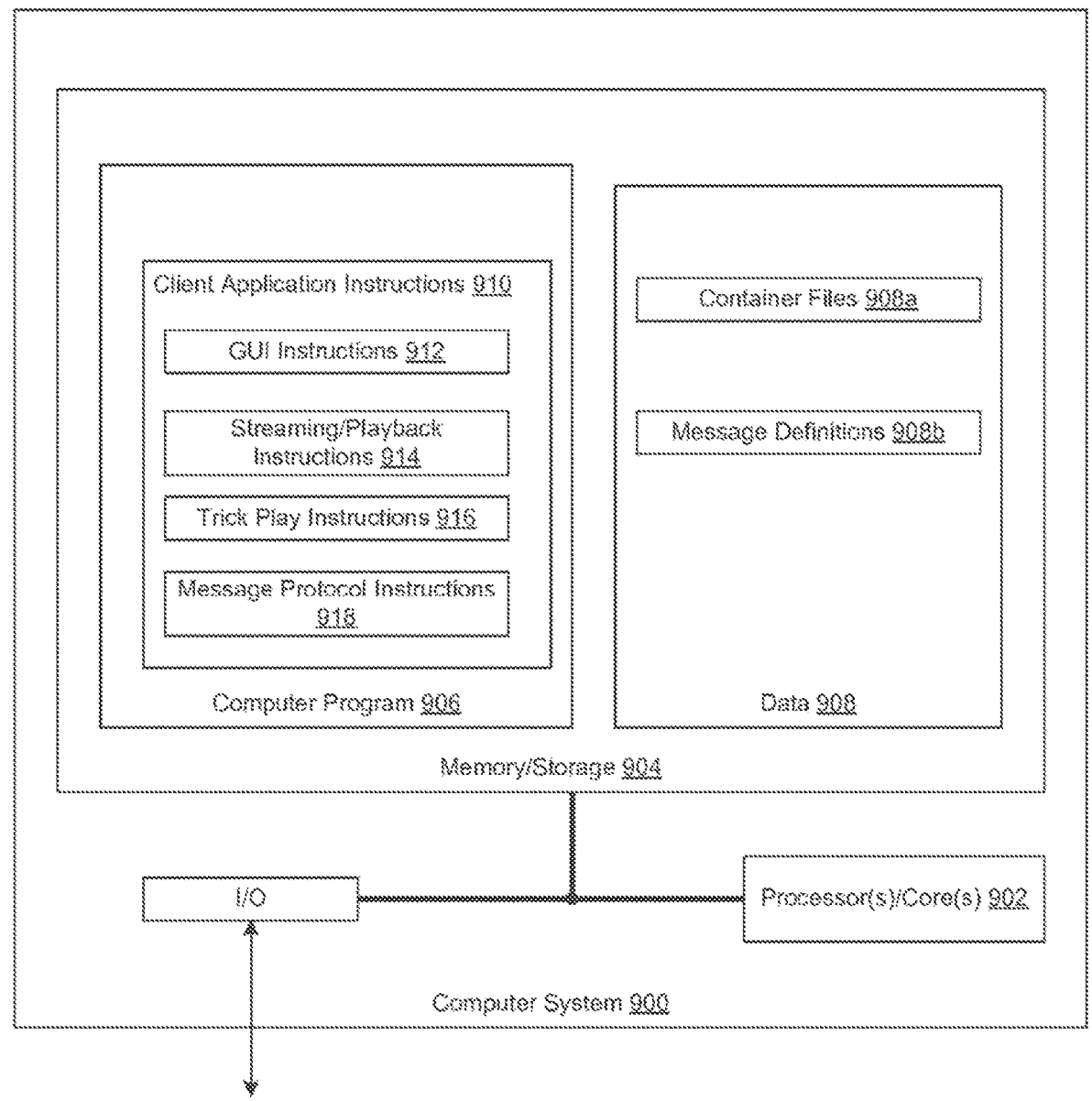
FIG. 9A is a block diagram of an example computer system.

FIG. 9A is a block diagram of a computer system 900 configured to support/perform streaming and trick play features as described herein.

Computer system 900 includes one or more computer instruction processing units and/or processor cores, illustrated here as processor 902, to execute computer readable instructions, also referred to herein as computer program logic.

Computer system 900 may include memory, cache, registers, and/or storage, illustrated here as memory 904, which may include a non-transitory computer readable medium encoded with computer programs, illustrated here as computer program 906.

Memory 904 may include data 908 to be used by processor 902 in executing computer program 906, and/or generated by processor 902 during execution of computer program 906. Data 908 may include container files 908*a* from adaptive bitrate streams and trick play streams, and message definitions 908*b* for GetPlaylist, Playlist, and Profile messages, such as used in the methods described herein.

Computer program 906 may include:

Client application instructions 910 to cause processor 902 to perform client device functions as described herein. Instructions 910 include:

GUI instructions 912 to implement a GUI through which a user may select to stream a program and select trick play features;

streaming and playback instructions 914 to download, decode, and playback streamed video content;

trick play instructions 916 to implement trick play features; and message protocol instructions 918 to implement client side message exchange protocols/sequences (sending and receiving of messages) as described in one or more examples above.

Instructions 910-918 cause processor 902 to perform functions such as described in one or more examples above.

Figure 9B:
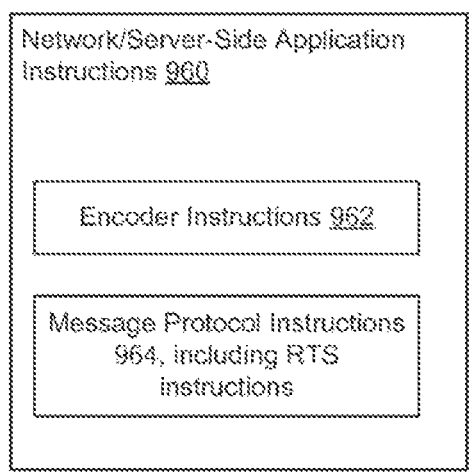
FIG. 9B is a block diagram of network/server-side application instructions which may execute in on a processor system similar to that of FIG. 9A.

FIG. 9B is a block diagram of network/server-side application instructions 960 which may execute in a processing environment similar to that of computer system 900, and which may be hosted in encoder 110, RTS 114, and/or CDN 112, as appropriate.

Network/server-side application instructions 960 cause a processor to perform network-side (network services) functions as described herein. Instructions 960 have access to adaptive bitrate streams, trick play streams, indexes identifying the streams, and message definitions as described in one or more example above. Instructions 960 include:

encoder instructions 962 to encode multimedia content into adaptive bitrate streams and trick play streams, as described in one or more example above; and message protocol instructions 964, including RTS instructions, to implement network side message exchange protocols/sequences (sending and receiving of messages) in support of adaptive bitrate streaming and trick play streaming, e.g., between RTS 114, client device 104, encoder 110, and CDN 112, as described in one or more examples above. For example, instructions 964 include instructions to create and send Profile and Playlist messages, and to respond to Get-Playlist messages.

Methods and systems disclosed herein may be implemented with respect to one or more of a variety of systems including one or more consumer systems, such as described below with reference to FIGS. 10 and 11. Methods and systems disclosed herein are not, however, limited to the examples of FIGS. 10 and 11.

Figure 10:
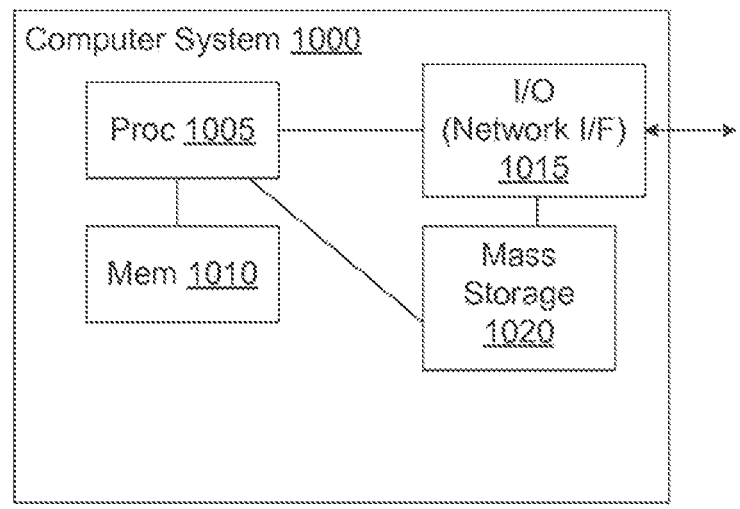
FIG. 10 is a block diagram of an example computer system corresponding to any of the network servers in the environment of FIG. 1.

FIG. 10 is a block diagram of an example computer system 1000 corresponding to any of network services 102, including encoder 110, CDN 112, and RTS 114. Computer system 1000, which may be, e.g., a server, includes one or more processors 1005, a memory 1010 in which instruction sets and databases for computer program applications are stored, a mass storage 1020 for storing, e.g., encoded programs, and an input/output (I/O) module 1015 through which components of computer system 1100 may communicate with communication network 106.

Figure 11:
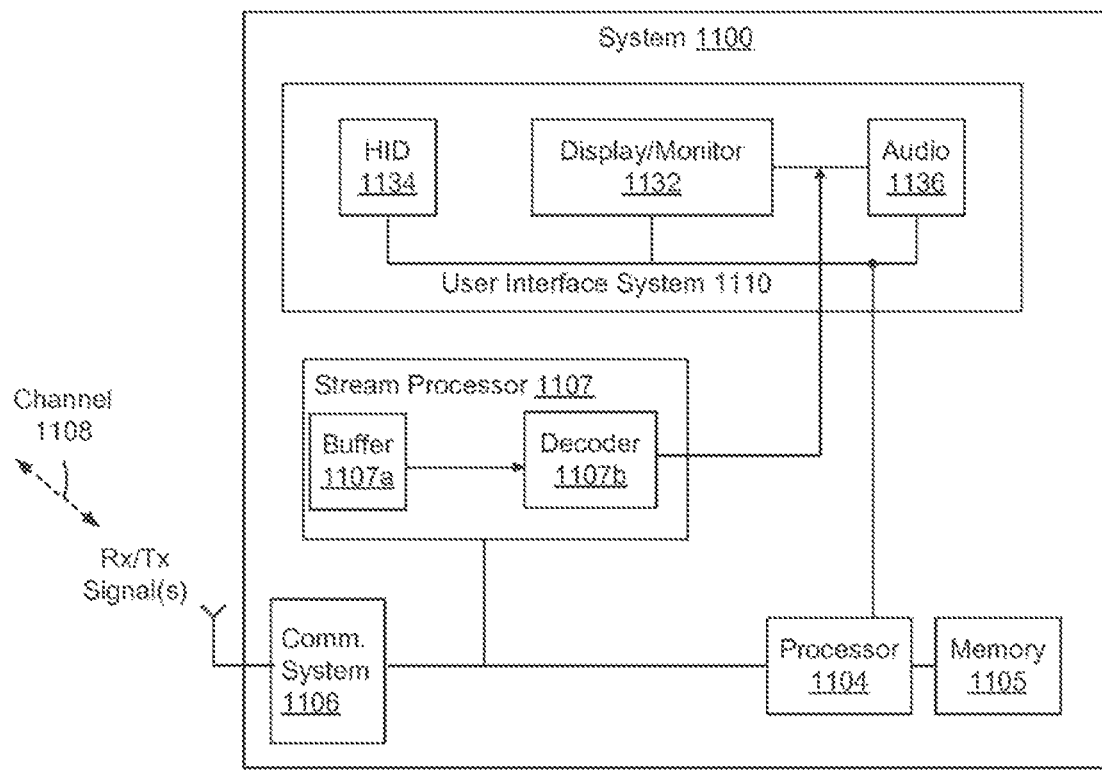
FIG. 11 is a block diagram of an example system representing a client device of FIG. 1.

FIG. 11 is a block diagram of an example system 1100 representing, e.g., client device 104, and may be implemented, and configured to operate, as described in one or more examples herein.

System 1100 or portions thereof may be implemented within one or more integrated circuit dies, and may be implemented as a system-on-a-chip (SoC).

System 1100 may include one or more processors 1104 to execute client-side application programs stored in memory 1105.

System 1100 may include a communication system 1106 to interface between processors 1104 and communication networks, such as networks 106. Communication system 1106 may include a wired and/or wireless communication system.

System 1100 may include a stream processor 1107 to process program (i.e., content) streams, received over communication channel 1108 and through communication system 1106, for presentation at system 1100. Stream processor 1107 includes a buffer 1107a to buffer portions of received, streamed programs, and a decoder 1107b to decode and decrypt the buffered programs in accordance with encoding and encryption standards, and using decryption keys. In an alternative embodiment, decoder 1107b may be integrated with a display and graphics platform of system 1100. Stream processor 1107 together with processors 1104 and memory 1105 represent a controller of system 1100. This controller includes modules to perform the functions of one or more examples described herein, such as a streaming module to stream programs through communication system 1106.

System 1100 may include a user interface system 1110.

User interface system 1110 may include a monitor or display 1132 to display information from processor 1104, such as a client-side GUI.

User interface system 1110 may include a human interface device (HID) 1134 to provide user input to processor 1104. HID 1134 may include, for example and without limitation, one or more of a key board, a cursor device, a touch-sensitive device, and or a motion and/or image sensor. HID 1134 may include a physical device and/or a virtual device, such as a monitor-displayed or virtual keyboard.

User interface system 1110 may include an audio system 1136 to receive and/or output audible sound.

System 1100 may correspond to, for example, a computer system, a personal communication device, and/or a television set-top box.

System 1100 may include a housing, and one or more of communication system 1106, processors 1104, memory 1105, user interface system 1110, or portions thereof may be positioned within the housing. The housing may include, without limitation, a rack-mountable housing, a desk-top housing, a lap-top housing, a notebook housing, a net-book housing, a set-top box housing, a portable housing, and/or other conventional electronic housing and/or future-developed housing. For example, communication system 1102 may be implemented to receive a digital television broadcast signal, and system 1100 may include a set-top box housing or a portable housing, such as a mobile telephone housing.

Methods and systems disclosed herein may be implemented in circuitry and/or a machine, such as a computer system, and combinations thereof, including discrete and integrated circuitry, application specific integrated circuitry (ASIC), a processor and memory, and/or a computer-readable medium encoded with instructions executable by a processor, and may be implemented as part of a domain-specific integrated circuit package, a system-on-a-chip (SOC), and/or a combination of integrated circuit packages.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples.

The scope of the claims should not be limited by any of the example embodiments disclosed herein.

What is claimed is:

1. A content distribution system, comprising:
a set of one or more encoding servers, wherein each server of the set of encoding servers comprises:
a non-volatile storage containing an encoder application; and
at least one processor;
wherein the encoder application cause the set of encoding servers to:
encode a video into a plurality of adaptive bitrate streams and a trick play stream, wherein each of the plurality of adaptive bitrate streams and the trick play stream comprises files of encoded video, wherein segments of encoded video from the plurality of adaptive bitrate streams comprise encoded video frames, including non-key frames each encoded based on video from one or more previous video frames, and key-frames interspersed among the non-key frames, each of the key-frames encoded independent of previous video frames, and wherein segments of encoded video from the trick play stream comprise encoded video frames, including only key-frames without non-key frames;
store the files of encoded video for each of the plurality of adaptive bitrate streams and the trick play stream in sequences of successive container files, wherein each container file comprises a segment of encoded video, wherein the trick play stream is stored in separate successive trick play files with successive time codes, wherein the trick play files include, in a time-ordered sequence, only key-frames without non-key frames; and
wherein the trick play stream is encoded at a lower frame rate than frame rates of the plurality of adaptive bitrate streams; and
wherein each frame of the trick play stream is a key-frame that is encoded independent of other encoded video frames.

2. The content distribution system of claim 1, wherein the encoder application further causes the encoding servers to:
receive a playlist request for a selected one of the plurality of adaptive bitrate streams, wherein the playlist request includes a first time;
in response to the received playlist request, generate a playlist identifying a set of successive container files storing segments of encoded video for the selected adaptive bitrate stream, wherein the set of successive container files starts at the first time;
receive a trick play playlist request for the trick play stream, wherein the trick play playlist request includes a second time and a trick play direction; and
in response to the received trick play playlist request, generate a trick play playlist identifying a different set of container files storing segments of encoded video from the trick play stream, wherein the different set of container files starts at the second time in an order based on the received trick play direction.

3. The content distribution system of claim 1, wherein:
the successive container files for each of the plurality of adaptive bitrate streams are associated with successive time codes; and
the play list generated for the selected adaptive bitrate stream identifies the set of successive container files in the selected adaptive bitrate using successive time codes greater than the first time.

4. The content distribution system of claim 2, wherein:
the encoding includes encoding the video based on a distinct combination of an encoding bitrate and a video frame rate for each of the plurality of adaptive bitrate streams; and
the encoding bitrate and video frame rate for the trick play stream are less than the encoding bitrates and video frame rates, respectively, for the plurality of adaptive bitrate streams.

5. The content distribution system of claim 2, wherein:
the storing includes storing the sequences of successive container files at corresponding network addresses;
the play list identifying the set of successive container files of the selected adaptive bitrate stream includes a list of the network addresses of the set of successive container files; and
the playlist identifying the different set of successive container files of the trick play stream includes a list of the network addresses of the different set of successive container files.

6. The content distribution system of claim 5, wherein: the trick play direction is a rewind direction; the second time is greater than the first time; and the trick play playlist identifies the different set of container files in the trick play stream using successively decreasing time codes that are each less than the second time.

7. The content distribution system of claim 1, wherein the trick play stream comprises a plurality of trick play streams.

8. The content distribution system of claim 1, wherein the trick play stream is encoded at a lower bit rate than the plurality of adaptive bitrate streams.

9. A method of supporting video streaming with trick play, comprising:
encoding a video into a plurality of adaptive bitrate streams and a trick play stream, wherein each of the plurality of adaptive bitrate streams and the trick play stream comprises files of encoded video;
storing the files of encoded video for each of the plurality of adaptive bitrate streams and the trick play stream in sequences of successive container files, wherein each container file comprises a segment of encoded video, wherein the trick play stream is stored in separate successive trick play files with successive time codes, wherein the trick play files include, in a time-ordered sequence, only key-frames without non-key frames;
wherein: the encoded video in the files corresponding to the plurality of adaptive bitrate streams comprises encoded video frames, including non-key frames each encoded based on video from one or more previous video frames, and key frames interspersed among the non-key frames, each of the key frames encoded independent of previous video frames; wherein the segments of encoded video from the trick play stream comprise encoded video frames, including only key-frames without non-key frames.

10. The method of claim 9, further comprising:
receiving a playlist request for a selected one of the plurality of adaptive bitrate streams, wherein the playlist request includes a first time;
in response to the received playlist request, generating a playlist identifying a set of successive container files storing segments of encoded video for the selected adaptive bitrate stream, wherein the set of successive container files starts at the first time;
receiving a trick play playlist request for the trick play stream, wherein the trick play playlist request includes a second time and a trick play direction;

and in response to the received trick play playlist request, generating a trick play playlist identifying a different set of container files storing segments of encoded video from the trick play stream, wherein the different set of container files starts at the second time in an order based on the received trick play direction.

11. The method of claim 10, wherein: the successive container files for each of the plurality of adaptive bitrate streams are associated with successive time codes; and the play list generated for the selected adaptive bitrate stream identifies the set of successive container files in the selected adaptive bitrate stream using successive time codes greater than the first time.

12. The method of claim 11, wherein: the trick play direction is a rewind direction; the second time is greater than the first time; and the trick play playlist identifies the different set of container files in the trick play stream using successively decreasing time codes that are each less than the second time.

13. The method of claim 10, wherein: the encoding includes encoding the video based on a distinct combination of an encoding bitrate and a video frame rate for each of the plurality of adaptive bitrate streams; and the encoding bitrate and video frame rate for the trick play stream are less than the encoding bitrates and video frame rates, respectively, for the plurality of adaptive bitrate streams.

14. The method of claim 10, wherein: the storing includes storing the sequences of successive container files at corresponding network addresses; the play list identifying the set of successive container files of the selected adaptive bitrate stream includes a list of the network addresses of the set of successive container files;

and the playlist identifying the different set of successive container files of the trick play stream includes a list of the network addresses of the different set of successive container files.

\* \* \* \* \*